(12) United States Patent
Yokoyama et al.

(10) Patent No.: US 8,515,802 B2
(45) Date of Patent: Aug. 20, 2013

(54) SYSTEM AND METHOD FOR RECOMMENDING CHANGES TO INFORMATION TECHNOLOGY SYSTEM JOBS BASED ON MANAGEMENT COST AND JOB DEGREE OF SIMILARITY

(75) Inventors: Shoichi Yokoyama, Yokohama (JP); Takeshi Anzai, Yokohama (JP); Takeshi Arisaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 78 days.

(21) Appl. No.: 13/147,934

(22) PCT Filed: May 2, 2011

(86) PCT No.: PCT/JP2011/060531
§ 371 (c)(1),
(2), (4) Date: Aug. 4, 2011

(87) PCT Pub. No.: WO2012/150628
PCT Pub. Date: Nov. 8, 2012

(65) Prior Publication Data
US 2012/0284088 A1 Nov. 8, 2012

(51) Int. Cl.
*G06Q 10/00* (2012.01)
(52) U.S. Cl.
USPC ......................................... 705/7.38; 705/7.25
(58) Field of Classification Search
USPC .......................................... 705/7.11, 7.25, 7.38
See application file for complete search history.

(56) References Cited

U.S. PATENT DOCUMENTS

| | | | | |
|---|---|---|---|---|
| 5,963,911 A | * | 10/1999 | Walker et al. | 705/7.12 |
| 6,101,481 A | * | 8/2000 | Miller | 705/7.13 |
| 6,865,581 B1 | * | 3/2005 | Cloninger et al. | 705/7.42 |
| 7,149,700 B1 | * | 12/2006 | Munoz et al. | 705/7.27 |
| 7,617,230 B2 | * | 11/2009 | Srivastava | 1/1 |
| 7,644,134 B2 | * | 1/2010 | Cohen et al. | 709/218 |
| 7,650,633 B2 | * | 1/2010 | Whitson | 726/6 |
| 7,752,562 B2 | * | 7/2010 | Mohanty et al. | 715/765 |
| 7,836,452 B2 | * | 11/2010 | Taylor | 718/104 |

(Continued)

FOREIGN PATENT DOCUMENTS

| | | |
|---|---|---|
| JP | 08-181693 A | 7/1996 |
| JP | 09245087 | 9/1997 |

(Continued)

OTHER PUBLICATIONS

Castano, S. et al., Artemis: A Process Modeling and Analysis Tool Environment ER'98, 1998.*

(Continued)

*Primary Examiner* — Scott L. Jarrett
(74) *Attorney, Agent, or Firm* — Volpe and Koenig, P.C.

(57) ABSTRACT

An embodiment of this invention is a system that recommends a change of management jobs for a plurality of apparatuses separated into a plurality of groups. This system selects groups one by one from the plurality of groups. It determines a similarity degree among the management jobs set to the plurality of groups after changing the current management job to a different management job. It determines at least either one of a management cost of the current management job and a management cost of the different management job. It determines a recommendation degree of the change of the management job using the determined similarity degree and the determined management cost. It presents a pair for a recommended change of management jobs in accordance with the determined recommendation degrees.

13 Claims, 26 Drawing Sheets

(56) References Cited

U.S. PATENT DOCUMENTS

| | | | |
|---|---|---|---|
| 7,941,336 B1* | 5/2011 | Robin-Jan | 705/7.13 |
| 8,099,415 B2* | 1/2012 | Luo et al. | 707/736 |
| 8,301,477 B2* | 10/2012 | Allam et al. | 705/7.12 |
| 8,413,211 B2* | 4/2013 | Tokutani et al. | 726/2 |
| 2002/0002479 A1* | 1/2002 | Almog et al. | 705/8 |
| 2003/0139953 A1* | 7/2003 | Guenther et al. | 705/7 |
| 2003/0139956 A1* | 7/2003 | Guenther et al. | 705/7 |
| 2009/0300711 A1* | 12/2009 | Tokutani et al. | 726/1 |
| 2011/0055167 A1* | 3/2011 | Howey | 707/687 |

FOREIGN PATENT DOCUMENTS

| | | |
|---|---|---|
| JP | 11250080 | 9/1999 |
| JP | 2005-267491 A | 9/2005 |
| JP | 2009070193 | 4/2009 |
| JP | 2010176288 | 8/2010 |

OTHER PUBLICATIONS

Reijers, H.A. et al., Best Practices in business process redesign: an overview and qualitative evaluation of successful redesign heuristics, The International Journal of Management, Omega, vol. 33, 2005.*

Castano, Silvana et al., A Schema Analysis and Reconcilation Tool Environment for Heterogenous Databases Proceeding Ideas '99 Proceedings of the 1999 International Symposium on Database Engineering & Applications, 1999.*

Ma, Dat C. et al., Automatic Merfing of Work Items in Business Process Management Systems BIS2007, 2007.*

Sun, Shuang et al., Merging Workflows: A New Perspective on Connecting Business Processes Pennslyvania State University, Jan. 31, 2005.*

* cited by examiner

FIG. 3

| T01 | T02 | T03 | T04 |
|---|---|---|---|
| | MANAGEMENT JOB ID | MANAGEMENT ITEM | MANAGEMENT POLICY / MANAGEMENT JOB |
| DEPARTMENT A | SVUP01 | SOFTWARE UPGRADING | AUTOMATICALLY INSTALL LATEST VERSION IMMEDIATELY |
| DEPARTMENT B | SVUP01 | SOFTWARE UPGRADING | AUTOMATICALLY INSTALL LATEST VERSION IMMEDIATELY |
| DEPARTMENT C | SVUP02 | SOFTWARE UPGRADING | DISTRIBUTE INSTALLER OF LATEST VERSION IMMEDIATELY |
| DEPARTMENT D | SVUP03 | SOFTWARE UPGRADING | AUTOMATICALLY INSTALL AT NEXT LOG-ON |
| DEPARTMENT E | SVUP04 | SOFTWARE UPGRADING | PERIODICALLY DISTRIBUTE INSTALLER OF LATEST VERSION |
| DEPARTMENT F | SVUP05 | SOFTWARE UPGRADING | DO NOT UPGRADE |
| DEPARTMENT A | INVENTORY01 | INVENTORY COUNTING | CHECK STOCK BY USER'S INPUT TO COMPUTER |
| DEPARTMENT B | INVENTORY01 | INVENTORY COUNTING | CHECK STOCK BY USER'S INPUT TO COMPUTER |
| DEPARTMENT C | INVENTORY01 | INVENTORY COUNTING | CHECK STOCK BY USER'S INPUT TO COMPUTER |
| DEPARTMENT D | INVENTORY02 | INVENTORY COUNTING | EXPORT ASSET INFORMATION AND CHECK ACTUAL ITEMS |
| DEPARTMENT E | INVENTORY02 | INVENTORY COUNTING | EXPORT ASSET INFORMATION AND CHECK ACTUAL ITEMS |
| DEPARTMENT F | INVENTORY03 | INVENTORY COUNTING | CHECK ACTUAL ITEM USING BARCODE READER |
| DEPARTMENT A | PWS01 | PASSWORD SECURITY | RECOMMEND CHANGING LOW-SECURITY PASSWORD TO USER |
| DEPARTMENT B | PWS01 | PASSWORD SECURITY | RECOMMEND CHANGING LOW-SECURITY PASSWORD TO USER |
| DEPARTMENT C | PWS01 | PASSWORD SECURITY | RECOMMEND CHANGING LOW-SECURITY PASSWORD TO USER |
| DEPARTMENT D | PWS01 | PASSWORD SECURITY | RECOMMEND CHANGING LOW-SECURITY PASSWORD TO USER |
| DEPARTMENT E | PWS01 | PASSWORD SECURITY | RECOMMEND CHANGING LOW-SECURITY PASSWORD TO USER |
| DEPARTMENT F | PWS01 | PASSWORD SECURITY | RECOMMEND CHANGING LOW-SECURITY PASSWORD TO USER |
| ... | ... | ... | ... |

FIG. 4

| DEPARTMENT INFORMATION | |
|---|---|
| T01 | T05 |
| DEPARTMENT | ADMINISTRATOR |
| DEPARTMENT A | ADMINISTRATOR X |
| DEPARTMENT B | ADMINISTRATOR X |
| DEPARTMENT C | ADMINISTRATOR X |
| DEPARTMENT D | ADMINISTRATOR X |
| DEPARTMENT E | ADMINISTRATOR X |
| DEPARTMENT F | ADMINISTRATOR X |
| ⋮ | ⋮ |

FIG. 6

| MANAGEMENT JOB TRIGGER | | |
|---|---|---|
| ~T02 | ~T06 | ~T07 |
| MANAGEMENT JOB ID | START TRIGGER | END TRIGGER |
| INVENTORY 01 | NOTIFY USER | RECEIVE INPUTS FROM ALL USERS OF MANAGEMENT TARGETS |
| INVENTORY 02 | START EXPORTING ASSET INFORMATION | COMPLETE IMPORT OF RESULTS OF INVENTORY COUNTING |
| INVENTORY 03 | START EXPORTING ASSET INFORMATION | COMPLETE IMPORT OF CHECK RESULTS BY BARCODE READER |
| ⋮ | ⋮ | ⋮ |

FIG. 7

MANAGEMENT JOB RECORD

| MANAGEMENT JOB RECORD ID (T08) | ADMINISTRATOR (T05) | DEPARTMENT (T01) | MANAGEMENT ITEM (T03) | MANAGEMENT JOB ID (T02) | NUMBER OF DEPARTMENTS UNDER CONCURRENT OPERATION (T09) | OPERATION LOG (T10) START | OPERATION LOG (T10) END |
|---|---|---|---|---|---|---|---|
| X-A:INVENTORY01-1 | ADMINISTRATOR X | DEPARTMENT A | INVENTORY COUNTING | INVENTORY01 | 1 | 100000000 | 100240000 |
| X-B:INVENTORY01-1 | ADMINISTRATOR X | DEPARTMENT B | INVENTORY COUNTING | INVENTORY01 | 1 | 100000000 | 100250000 |
| X-C:INVENTORY01-1 | ADMINISTRATOR X | DEPARTMENT C | INVENTORY COUNTING | INVENTORY01 | 1 | 100000000 | 100200000 |
| X-D:INVENTORY02-1 | ADMINISTRATOR X | DEPARTMENT D | INVENTORY COUNTING | INVENTORY02 | 1 | 100000000 | 101500000 |
| X-E:INVENTORY02-1 | ADMINISTRATOR X | DEPARTMENT E | INVENTORY COUNTING | INVENTORY02 | 1 | 100000000 | 101000000 |
| X-F:INVENTORY03-1 | ADMINISTRATOR X | DEPARTMENT F | INVENTORY COUNTING | INVENTORY03 | 1 | 100000000 | 100600000 |
| X-A:PWS01-1 | ADMINISTRATOR X | DEPARTMENT A | PASSWORD SECURITY | PWS01 | 1 | 100100000 | 100103000 |
| X-B:PWS01-1 | ADMINISTRATOR X | DEPARTMENT B | PASSWORD SECURITY | PWS01 | 1 | 100200000 | 100204000 |
| ... | ... | ... | ... | ... | ... | ... | ... |
| X-A:INVENTORY01-2 | ADMINISTRATOR X | DEPARTMENT A | INVENTORY COUNTING | INVENTORY01 | 1 | 130000000 | 130260000 |
| X-B:INVENTORY01-2 | ADMINISTRATOR X | DEPARTMENT B | INVENTORY COUNTING | INVENTORY01 | 1 | 130000000 | 130230000 |
| X-C:INVENTORY01-2 | ADMINISTRATOR X | DEPARTMENT C | INVENTORY COUNTING | INVENTORY01 | 1 | 130000000 | 130240000 |
| X-D:INVENTORY02-2 | ADMINISTRATOR X | DEPARTMENT D | INVENTORY COUNTING | INVENTORY02 | 1 | 130000000 | 131300000 |
| X-E:INVENTORY02-2 | ADMINISTRATOR X | DEPARTMENT E | INVENTORY COUNTING | INVENTORY02 | 1 | 130000000 | 131200000 |
| X-F:INVENTORY03-2 | ADMINISTRATOR X | DEPARTMENT F | INVENTORY COUNTING | INVENTORY03 | 1 | 130000000 | 130500000 |
| ... | ... | ... | ... | ... | ... | ... | ... |

FIG. 9

MANAGEMENT COST CALCULATION RECORD

| T01 | T03 | T02 | T08 | T11 |
|---|---|---|---|---|
| DEPARTMENT | MANAGEMENT ITEM | MANAGEMENT JOB ID | MANAGEMENT JOB RECORD ID | MANAGEMENT COST |
| DEPARTMENT A | INVENTORY COUNTING | INVENTORY01 | X-A:INVENTORY01-1 | 240000 |
| DEPARTMENT B | INVENTORY COUNTING | INVENTORY01 | X-B:INVENTORY01-1 | 250000 |
| DEPARTMENT C | INVENTORY COUNTING | INVENTORY01 | X-C:INVENTORY01-1 | 200000 |
| DEPARTMENT D | INVENTORY COUNTING | INVENTORY02 | X-D:INVENTORY02-1 | 1500000 |
| DEPARTMENT E | INVENTORY COUNTING | INVENTORY02 | X-E:INVENTORY02-1 | 1000000 |
| DEPARTMENT F | INVENTORY COUNTING | INVENTORY03 | X-F:INVENTORY03-1 | 600000 |
| DEPARTMENT A | PASSWORD SECURITY | PWS01 | X-A:PWS01-1 | 3000 |
| DEPARTMENT B | PASSWORD SECURITY | PWS01 | X-B:PWS01-1 | 4000 |
| ... | ... | ... | ... | ... |
| DEPARTMENT A | INVENTORY COUNTING | INVENTORY01 | X-A:INVENTORY01-2 | 260000 |
| DEPARTMENT B | INVENTORY COUNTING | INVENTORY01 | X-B:INVENTORY01-2 | 230000 |
| DEPARTMENT C | INVENTORY COUNTING | INVENTORY01 | X-C:INVENTORY01-2 | 240000 |
| DEPARTMENT D | INVENTORY COUNTING | INVENTORY02 | X-D:INVENTORY02-2 | 1300000 |
| DEPARTMENT E | INVENTORY COUNTING | INVENTORY02 | X-E:INVENTORY02-2 | 1200000 |
| DEPARTMENT F | INVENTORY COUNTING | INVENTORY03 | X-F:INVENTORY03-2 | 500000 |
| ... | ... | ... | ... | ... |

FIG.10

JOB-SPECIFIC MANAGEMENT COST

| ADMINISTRATOR ~T05 | DEPARTMENT ~T01 | MANAGEMENT ITEM ~T03 | ITEM-SPECIFIC AVERAGE MANAGEMENT COST ~T16 | MANAGEMENT JOB ID ~T02 | DEPARTMENT-SPECIFIC AVERAGE MANAGEMENT COST ~T12 |
|---|---|---|---|---|---|
| ADMINISTRATOR X | DEPARTMENT A | INVENTORY COUNTING | 626667 | INVENTORY01 | 250000 |
| ADMINISTRATOR X | DEPARTMENT B | INVENTORY COUNTING | 626667 | INVENTORY01 | 240000 |
| ADMINISTRATOR X | DEPARTMENT C | INVENTORY COUNTING | 626667 | INVENTORY01 | 220000 |
| ADMINISTRATOR X | DEPARTMENT D | INVENTORY COUNTING | 626667 | INVENTORY02 | 1400000 |
| ADMINISTRATOR X | DEPARTMENT E | INVENTORY COUNTING | 626667 | INVENTORY02 | 1100000 |
| ADMINISTRATOR X | DEPARTMENT F | INVENTORY COUNTING | 626667 | INVENTORY03 | 550000 |
| ADMINISTRATOR X | DEPARTMENT A | PASSWORD SECURITY | 3500 | PWS01 | 3000 |
| ADMINISTRATOR X | DEPARTMENT B | PASSWORD SECURITY | 3500 | PWS01 | 4000 |
| .... | .... | .... | .... | .... | .... |

FIG. 12

| INTER-JOB SIMILARITY DEGREE (INVENTORY COUNTING) | | | |
|---|---|---|---|
| | INVENTORY01 | INVENTORY02 | INVENTORY03 |
| INVENTORY01 | 100 | 0 | 0 |
| INVENTORY02 | — | 100 | 70 |
| INVENTORY03 | — | — | 100 |

FIG. 13

| | INTER-DEPARTMENT JOB SIMILARITY DEGREE (INVENTORY COUNTING) | | | | | |
|---|---|---|---|---|---|---|
| | DEPARTMENT A | DEPARTMENT B | DEPARTMENT C | DEPARTMENT D | DEPARTMENT E | DEPARTMENT F |
| DEPARTMENT A | | 100 | 100 | 0 | 0 | 0 |
| DEPARTMENT B | 100 | | 100 | 0 | 0 | 0 |
| DEPARTMENT C | 100 | 100 | | 0 | 0 | 0 |
| DEPARTMENT D | 0 | 0 | 0 | | 100 | 70 |
| DEPARTMENT E | 0 | 0 | 0 | 100 | | 70 |
| DEPARTMENT F | 0 | 0 | 0 | 70 | 70 | |
| DEPARTMENT-SPECIFIC TOTAL JOB SIMILARITY DEGREE | 200 | 200 | 200 | 170 | 70 | 140 |

| CALCULATED SIMILARITY DEGREE ||||
| T05 | T03 | T14 |
|---|---|---|
| ADMINISTRATOR | MANAGEMENT ITEM | SIMILARITY DEGREE |
| ADMINISTRATOR X | INVENTORY COUNTING | 36% |
| ⋮ | ⋮ | ⋮ |

FIG. 16

| MANAGEMENT JOB CHANGE ID (T15) | ADMINISTRATOR (T05) | MANAGE-MENT ITEM (T03) | MANAGEMENT JOB CHANGE PAIR (T01) DEPARTMENT | MANAGEMENT JOB ID (T02) BEFORE CHANGE | MANAGEMENT JOB ID (T02) AFTER CHANGE | MANAGE-MENT COST BEFORE CHANGE (T17) | SIMILARITY DEGREE (T14) BEFORE CHANGE | SIMILARITY DEGREE (T14) AFTER CHANGE | PRIORITY DEGREE (T18) |
|---|---|---|---|---|---|---|---|---|---|
| X-A:INVENTORY 01-02 | ADMINISTRATOR X | INVENTORY COUNTING | DEPARTMENT A | INVENTORY01 | INVENTORY02 | 250000 | 36% | 41% | 102500 |
| X-A:INVENTORY 01-03 | ADMINISTRATOR X | INVENTORY COUNTING | DEPARTMENT A | INVENTORY01 | INVENTORY03 | 250000 | 36% | 39% | 97500 |
| X-A:INVENTORY 01-02 | ADMINISTRATOR X | INVENTORY COUNTING | DEPARTMENT B | INVENTORY01 | INVENTORY02 | 240000 | 36% | 41% | 98400 |
| X-A:INVENTORY 01-03 | ADMINISTRATOR X | INVENTORY COUNTING | DEPARTMENT B | INVENTORY01 | INVENTORY03 | 240000 | 36% | 39% | 93600 |
| X-A:INVENTORY 01-02 | ADMINISTRATOR X | INVENTORY COUNTING | DEPARTMENT C | INVENTORY01 | INVENTORY02 | 220000 | 36% | 41% | 90200 |
| X-A:INVENTORY 01-03 | ADMINISTRATOR X | INVENTORY COUNTING | DEPARTMENT C | INVENTORY01 | INVENTORY03 | 220000 | 36% | 39% | 85800 |
| X-A:INVENTORY 02-01 | ADMINISTRATOR X | INVENTORY COUNTING | DEPARTMENT D | INVENTORY02 | INVENTORY01 | 1400000 | 36% | 45% | 630000 |
| X-A:INVENTORY 02-03 | ADMINISTRATOR X | INVENTORY COUNTING | DEPARTMENT D | INVENTORY02 | INVENTORY03 | 1400000 | 36% | 36% | 504000 |
| X-A:INVENTORY 02-01 | ADMINISTRATOR X | INVENTORY COUNTING | DEPARTMENT E | INVENTORY02 | INVENTORY01 | 1100000 | 36% | 45% | 495000 |
| X-A:INVENTORY 02-03 | ADMINISTRATOR X | INVENTORY COUNTING | DEPARTMENT E | INVENTORY02 | INVENTORY03 | 1100000 | 36% | 36% | 396000 |
| X-A:INVENTORY 03-01 | ADMINISTRATOR X | INVENTORY COUNTING | DEPARTMENT F | INVENTORY03 | INVENTORY01 | 550000 | 36% | 47% | 258500 |
| X-A:INVENTORY 03-02 | ADMINISTRATOR X | INVENTORY COUNTING | DEPARTMENT F | INVENTORY03 | INVENTORY02 | 550000 | 36% | 40% | 220000 |
| ..... | ..... | ..... | ..... | ..... | ..... | ..... | ..... | ..... | ..... |

FIG. 17

COMMONALIZATION RECOMMENDATION

| DEPARTMENT (T01) | MANAGEMENT ITEM (T03) | MANAGEMENT JOB CHANGE ID (T15) | ITEM-SPECIFIC AVERAGE MANAGEMENT COST (T16) | PRIORITY DEGREE (T18) |
|---|---|---|---|---|
| DEPARTMENT D | INVENTORY COUNTING | X-D:INVENTORY02-01 | 626667 | 630000 |
| DEPARTMENT D | INVENTORY COUNTING | X-D:INVENTORY02-03 | 626667 | 504000 |
| DEPARTMENT E | INVENTORY COUNTING | X-E:INVENTORY02-01 | 626667 | 495000 |
| ... | ... | ... | ... | ... |

FIG. 20

| DEPARTMENT T01 | MANAGEMENT JOB ID T02 | MANAGEMENT ITEM T03 | MANAGEMENT POLICY T04 MANAGEMENT JOB |
|---|---|---|---|
| DEPARTMENT A | SVUP01 | SOFTWARE UPGRADING | AUTOMATICALLY INSTALL LATEST VERSION IMMEDIATELY |
| DEPARTMENT B | SVUP01 | SOFTWARE UPGRADING | AUTOMATICALLY INSTALL LATEST VERSION IMMEDIATELY |
| DEPARTMENT C | SVUP02 | SOFTWARE UPGRADING | DISTRIBUTE INSTALLER OF LATEST VERSION IMMEDIATELY |
| DEPARTMENT D | SVUP03 | SOFTWARE UPGRADING | AUTOMATICALLY INSTALL AT NEXT LOG-ON |
| DEPARTMENT E | SVUP04 | SOFTWARE UPGRADING | PERIODICALLY DISTRIBUTE INSTALLER OF LATEST VERSION |
| DEPARTMENT F | SVUP05 | SOFTWARE UPGRADING | DO NOT UPGRADE |
| DEPARTMENT A | INVENTORY01 | INVENTORY COUNTING | CHECK STOCK BY USER'S INPUT TO COMPUTER |
| DEPARTMENT B | INVENTORY01 | INVENTORY COUNTING | CHECK STOCK BY USER'S INPUT TO COMPUTER |
| DEPARTMENT C | INVENTORY01 | INVENTORY COUNTING | CHECK STOCK BY USER'S INPUT TO COMPUTER |
| DEPARTMENT D | INVENTORY01 | INVENTORY COUNTING | CHECK STOCK BY USER'S INPUT TO COMPUTER |
| DEPARTMENT E | INVENTORY02 | INVENTORY COUNTING | EXPORT ASSET INFORMATION AND CHECK ACTUAL ITEMS |
| DEPARTMENT F | INVENTORY03 | INVENTORY COUNTING | CHECK ACTUAL ITEM USING BARCODE READER |
| DEPARTMENT A | PWS01 | PASSWORD SECURITY | RECOMMEND CHANGING LOW-SECURITY PASSWORD TO USER |
| DEPARTMENT B | PWS01 | PASSWORD SECURITY | RECOMMEND CHANGING LOW-SECURITY PASSWORD TO USER |
| DEPARTMENT C | PWS01 | PASSWORD SECURITY | RECOMMEND CHANGING LOW-SECURITY PASSWORD TO USER |
| DEPARTMENT D | PWS01 | PASSWORD SECURITY | RECOMMEND CHANGING LOW-SECURITY PASSWORD TO USER |
| DEPARTMENT E | PWS01 | PASSWORD SECURITY | RECOMMEND CHANGING LOW-SECURITY PASSWORD TO USER |
| DEPARTMENT F | PWS01 | PASSWORD SECURITY | RECOMMEND CHANGING LOW-SECURITY PASSWORD TO USER |
| ... | ... | ... | ... |

FIG. 21

| MANAGEMENT JOB RECORD ||||||||
| --- | --- | --- | --- | --- | --- | --- | --- |
| T08 | T05 | T01 | T03 | T02 | T09 | T10 ||
| | | | | | | OPERATION LOG ||
| MANAGEMENT JOB RECORD ID | ADMINISTRATOR | DEPARTMENT | MANAGEMENT ITEM | MANAGEMENT JOB ID | NUMBER OF DEPARTMENTS UNDER CONCURRENT OPERATION | START | END |
| X-A:INVENTORY01-1 | ADMINISTRATOR X | DEPARTMENT A | INVENTORY COUNTING | INVENTORY01 | 1 | 100000000 | 100240000 |
| X-B:INVENTORY01-1 | ADMINISTRATOR X | DEPARTMENT B | INVENTORY COUNTING | INVENTORY01 | 1 | 100000000 | 100250000 |
| X-C:INVENTORY01-1 | ADMINISTRATOR X | DEPARTMENT C | INVENTORY COUNTING | INVENTORY01 | 1 | 100000000 | 100200000 |
| X-D:INVENTORY02-1 | ADMINISTRATOR X | DEPARTMENT D | INVENTORY COUNTING | INVENTORY02 | 1 | 100000000 | 101500000 |
| X-E:INVENTORY02-1 | ADMINISTRATOR X | DEPARTMENT E | INVENTORY COUNTING | INVENTORY02 | 1 | 100000000 | 101000000 |
| X-F:INVENTORY03-1 | ADMINISTRATOR X | DEPARTMENT F | INVENTORY COUNTING | INVENTORY03 | 1 | 100000000 | 100600000 |
| X-A:PWS01-1 | ADMINISTRATOR X | DEPARTMENT A | PASSWORD SECURITY | PWS01 | 1 | 100100000 | 100103000 |
| X-B:PWS01-1 | ADMINISTRATOR X | DEPARTMENT B | PASSWORD SECURITY | PWS01 | 1 | 100200000 | 100204000 |
| ... | ... | ... | ... | ... | ... | ... | ... |
| X-A:INVENTORY01-2 | ADMINISTRATOR X | DEPARTMENT A | INVENTORY COUNTING | INVENTORY01 | 1 | 130000000 | 130260000 |
| X-B:INVENTORY01-2 | ADMINISTRATOR X | DEPARTMENT B | INVENTORY COUNTING | INVENTORY01 | 1 | 130000000 | 130230000 |
| X-C:INVENTORY01-2 | ADMINISTRATOR X | DEPARTMENT C | INVENTORY COUNTING | INVENTORY01 | 1 | 130000000 | 130240000 |
| X-D:INVENTORY02-2 | ADMINISTRATOR X | DEPARTMENT D | INVENTORY COUNTING | INVENTORY02 | 1 | 130000000 | 131300000 |
| X-E:INVENTORY02-2 | ADMINISTRATOR X | DEPARTMENT E | INVENTORY COUNTING | INVENTORY02 | 1 | 130000000 | 131200000 |
| X-F:INVENTORY03-2 | ADMINISTRATOR X | DEPARTMENT F | INVENTORY COUNTING | INVENTORY03 | 1 | 130000000 | 1305000000 |
| ... | ... | ... | ... | ... | ... | ... | ... |
| X-F:INVENTORY01-1 | ADMINISTRATOR X | DEPARTMENT D | INVENTORY COUNTING | INVENTORY03 | 1 | 160000000 | 160270000 |
| ... | ... | ... | ... | ... | ... | ... | ... |

FIG. 24

| | | COMMONALIZATION EFFECTS T20 | | | | | | |
|---|---|---|---|---|---|---|---|---|
| | | | BEFORE CHANGE | | | AFTER CHANGE | | EFFECT |
| DEPARTMENT | MANAGEMENT ITEM T03 | MANAGEMENT JOB ID | SIMILARITY DEGREE | ITEM-SPECIFIC AVERAGE MANAGEMENT COST | MANAGEMENT JOB ID | SIMILARITY DEGREE | ITEM-SPECIFIC AVERAGE MANAGEMENT COST | |
| DEPARTMENT D | INVENTORY COUNTING | INVENTORY02 | 36% | 626667 | INVENTORY01 | 45% | 438333 | U |
| .... | .... | .... | .... | .... | .... | .... | .... | .... |

MANAGEMENT JOB CHANGE PAIR

| MANAGEMENT JOB CHANGE ID (T15) | ADMINISTRATOR (T05) | MANAGEMENT ITEM (T03) | DEPARTMENT (T01) | MANAGEMENT JOB ID (T02) | | MANAGEMENT COST BEFORE CHANGE (T17) | SIMILARITY DEGREE (T14) | | PRIORITY DEGREE (T18) |
|---|---|---|---|---|---|---|---|---|---|
| | | | | BEFORE CHANGE | AFTER CHANGE | | BEFORE CHANGE | AFTER CHANGE | |
| X-A:INVENTORY 01-02 | ADMINISTRATOR X | INVENTORY COUNTING | DEPARTMENT A | INVENTORY01 | INVENTORY02 | 250000 | 45% | 36% | 90000 |
| X-A:INVENTORY 01-03 | ADMINISTRATOR X | INVENTORY COUNTING | DEPARTMENT A | INVENTORY01 | INVENTORY03 | 250000 | 45% | 36% | 90000 |
| X-A:INVENTORY 01-02 | ADMINISTRATOR X | INVENTORY COUNTING | DEPARTMENT B | INVENTORY01 | INVENTORY02 | 240000 | 45% | 36% | 86400 |
| X-A:INVENTORY 01-03 | ADMINISTRATOR X | INVENTORY COUNTING | DEPARTMENT B | INVENTORY01 | INVENTORY03 | 240000 | 45% | 36% | 86400 |
| X-A:INVENTORY 01-02 | ADMINISTRATOR X | INVENTORY COUNTING | DEPARTMENT C | INVENTORY01 | INVENTORY02 | 220000 | 45% | 36% | 79200 |
| X-A:INVENTORY 01-03 | ADMINISTRATOR X | INVENTORY COUNTING | DEPARTMENT C | INVENTORY01 | INVENTORY03 | 220000 | 45% | 36% | 79200 |
| X-A:INVENTORY 01-02 | ADMINISTRATOR X | INVENTORY COUNTING | DEPARTMENT D | INVENTORY01 | INVENTORY02 | 270000 | 45% | 36% | 97200 |
| X-A:INVENTORY 01-03 | ADMINISTRATOR X | INVENTORY COUNTING | DEPARTMENT D | INVENTORY01 | INVENTORY03 | 270000 | 45% | 36% | 97200 |
| X-A:INVENTORY 02-01 | ADMINISTRATOR X | INVENTORY COUNTING | DEPARTMENT E | INVENTORY02 | INVENTORY01 | 1100000 | 45% | 67% | 737000 |
| X-A:INVENTORY 02-03 | ADMINISTRATOR X | INVENTORY COUNTING | DEPARTMENT E | INVENTORY02 | INVENTORY03 | 1100000 | 45% | 47% | 517000 |
| X-A:INVENTORY 03-01 | ADMINISTRATOR X | INVENTORY COUNTING | DEPARTMENT F | INVENTORY03 | INVENTORY01 | 550000 | 45% | 67% | 368500 |
| X-A:INVENTORY 03-02 | ADMINISTRATOR X | INVENTORY COUNTING | DEPARTMENT F | INVENTORY03 | INVENTORY02 | 550000 | 45% | 47% | 258500 |
| .... | .... | .... | .... | .... | .... | .... | .... | .... | .... |

SYSTEM AND METHOD FOR RECOMMENDING CHANGES TO INFORMATION TECHNOLOGY SYSTEM JOBS BASED ON MANAGEMENT COST AND JOB DEGREE OF SIMILARITY

BACKGROUND

This invention relates to a recommendation system for changing management jobs, a method of recommending change of management jobs, and a storage medium, and, in particular, relates to a technique that determines a pair of management jobs which is recommended to be interchanged in management jobs set to a plurality of apparatus groups.

Enterprises having a plurality of departments generally have system management departments that mainly undertake asset management and security management on in-house client equipment (including computers and network connection apparatuses). Such system management departments integrally control client equipment across departments.

Desired asset management and security measures are different depending on the activities of the department; asset management and security measures are optimized for individual departments. Consequently, the activities of a system management department become more complex and diverse to increase the management costs of administrators. Hence, demanded is to reduce the management costs while keeping management policies optimized to individual departments as much as possible. To reduce the management cost, commonalization of the management policies is effective so that the management jobs can be conducted in a plurality of department in a batch.

As a conventional technique, a method of monitoring job costs of an operator is disclosed in Patent Literature 1. This method calculates the workload or the degree of fatigue of the operator based on information from a touch sensor or a myoelectric sensor attached to a keyboard or a mouse and changes physical working conditions such as the position of the operator and the brightness in the working environment in accordance with the calculated value. Such control achieves improvement in work environment for visual display terminal (VDT) operators.

Another technique that supports to locate the cause of a failure in a network system based on the similarity degree in failure information written in the details of failures (failure subjects, vendor names, product names, failure types, frequency of occurrence, and affected range) is disclosed in Patent Literature 2. This method compares new failure information with existing failure information with respect to the foregoing failure details to calculate a similarity degree based on the number of matching items, and presents the cause and the countermeasure of the existing failure information having the high similarity degree to the new failure information. Through this configuration, the working cost to determine the cause and the countermeasure of a new failure is reduced.

Patent Literature 1 JP 2005-267491 A
Patent Literature 2 JP 8-181693 A

SUMMARY

The technique in Patent Literature 1 achieves reduction of the workload and the degree of fatigue of an operator by changing physical working conditions in the case where it is determined that they are high. This document, however, does not disclose standardizing management jobs (including changing management jobs to the same single management job or similar management jobs) among a plurality of management jobs for a plurality of apparatuses.

Moreover, since the technique in Patent Literature 1 pays attention to one procedure, so that the effect of changing the physical working conditions is attained within one procedure. In other words, it does not consider the relationship with the other procedures. Consequently, this technique cannot reduce the management cost of a plurality of management jobs for a plurality of apparatuses.

The conventional technique in Patent Literature 2 determines a cause and a countermeasure of new failure information by presenting a cause and a countermeasure of existing failure information having a high similarity degree to new failure information to reduce the working cost. This document, however, does not disclose commonalization of management jobs among a plurality of management jobs for a plurality of apparatuses.

This technique does not indicate a predetermined operation procedure to be changed into another one. The conventional technique merely indicates that the cause and the countermeasure of existing failure information selected in terms of the similarity degree can be applied to the new failure information. Accordingly, this technique cannot determine how the operation procedure should be changed to improve efficiency of management jobs.

An object of this invention is, with respect to a plurality of management jobs set to a plurality of apparatuses, to provide a method of recommending change of management jobs to an administrator that achieves effective reduction in the workload on the management jobs.

An aspect of the invention is a management system for recommending changes of management jobs for a plurality of apparatuses included in one or more computer systems and separated into a plurality of groups. The management system comprises a processor and a storage device. The storage device includes inter-management-job similarity degree information including information on similarity degrees between a plurality of management jobs, management cost information including information on management costs for indicating degrees of load of the plurality of management jobs, and group management job information for indicating management jobs currently set to the plurality of groups, respectively. The processor selects groups one by one from the plurality of groups, and, on each of the selected groups, performs identifying a current management job set to the selected group with reference to the group management job information, determining a similarity degree among management jobs set to the plurality of groups after changing the current management job to a different management job with reference to the inter-management-job similarity degree information, determining at least either one of a management cost of the current management job and a management cost of the different management job with reference to the management cost information; and determining a recommendation degree of the change of the management job using the determined similarity degree and the determined management cost. The processor further creates information for presenting a pair for a recommended change of management jobs in accordance with the determined recommendation degrees in the groups selected one by one.

This invention can provide, with respect to a plurality of management jobs set to a plurality of apparatuses, a system administrator with recommendations of changing management jobs to achieve effective reduction in the workload on the management jobs.

BRIEF DESCRIPTION OF THE DRAWINGS

FIG. 3 is a view exemplifying management policy information in this embodiment;

FIG. 4 is a view exemplifying department information in this embodiment;

FIG. 6 is a view exemplifying management job triggers in this embodiment;

FIG. 7 is a view exemplifying management job records in this embodiment;

FIG. 9 is a view exemplifying management cost calculation record information in this embodiment;

FIG. 10 is a view exemplifying job-specific management cost information in this embodiment;

FIG. 12 is a view exemplifying inter-job similarity degree information in this embodiment;

FIG. 13 is a view exemplifying inter-department job similarity degree information in this embodiment;

FIG. 14 is a view exemplifying calculated similarity degrees in this embodiment;

FIG. 16 is a view exemplifying management job change pairs in this embodiment;

FIG. 17 is a view exemplifying commonalization recommendations in this embodiment;

FIG. 20 is a view exemplifying management policy information after changing management policies in this embodiment;

FIG. 21 is a view exemplifying management job record information after changing management policies in this embodiment;

FIG. 24 is a view exemplifying commonalization effects in this embodiment;

FIG. 25 is a view exemplifying management job change pairs after changing management policies in this embodiment.

DETAILED DESCRIPTION OF THE PREFERRED EMBODIMENTS

Figure 1:
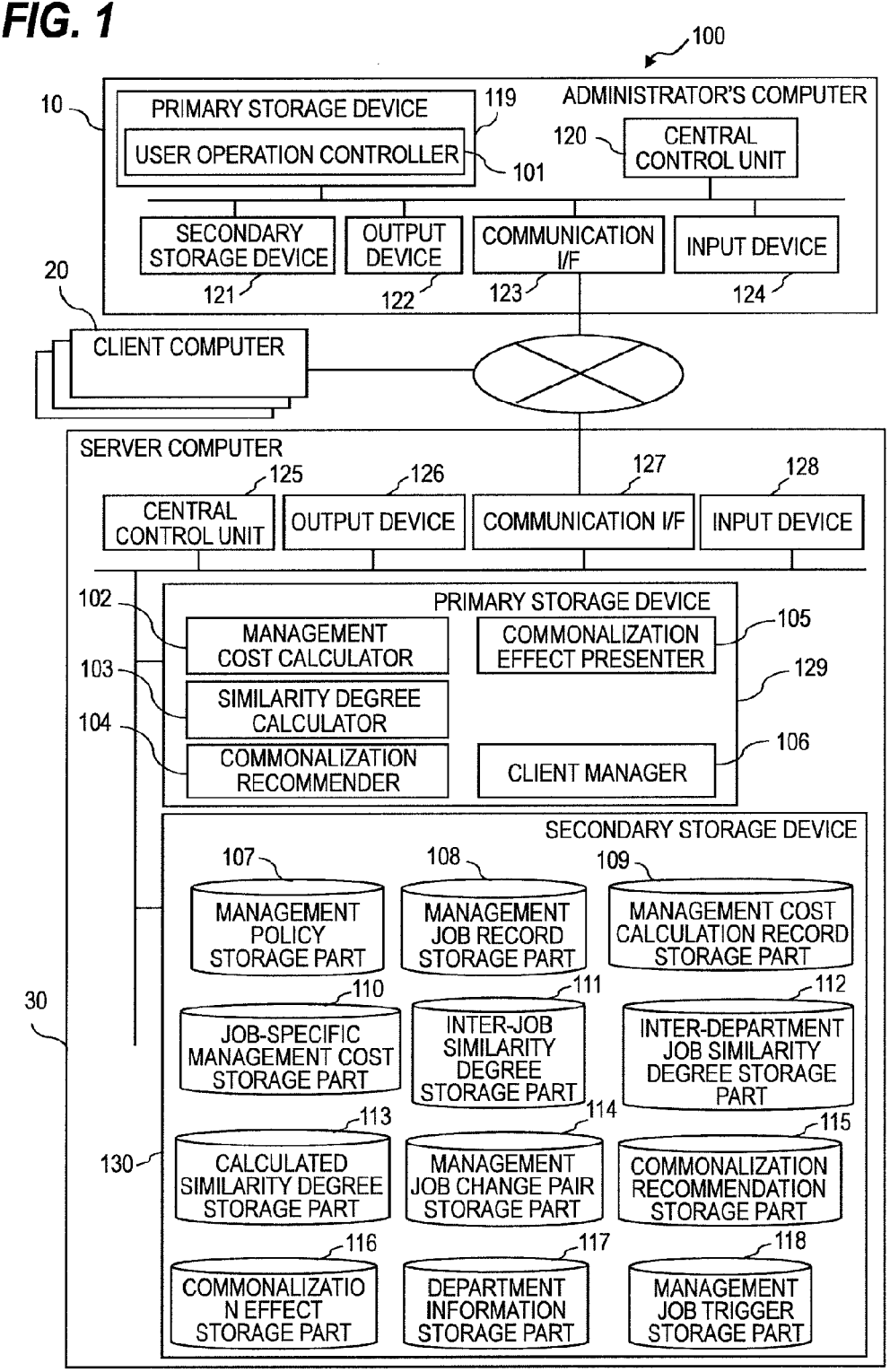
FIG. 1 is a diagram illustrating a configuration example of a system of this embodiment.

Hereinafter, an embodiment of this invention will be described with reference to the accompanying drawings. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

This embodiment discloses a technique to recommend commonalization of management jobs in IT system management. In this embodiment, the managed information processing apparatuses (including computers and network connection apparatuses) are separated into a plurality of groups. In a preferable example in the following description, the managed apparatuses belong to a plurality of departments.

The IT system management prepares a plurality of kinds of management jobs and sets the management jobs to the apparatuses belonging to each department (apparatus group). A system administrator performs the management jobs set to the apparatuses in each department.

This embodiment recommends commonalization of management jobs set to a plurality of departments. Specifically, it recommends changing a management job set to some department to a different one. The commonalization includes changing a management job for one department to a management job similar to the one for a different department, in addition to changing it to the identical management job for a different department.

In particular, this embodiment presents a pair of management jobs which is recommended to be interchanged (a pair of management jobs before and after the change) based on management costs, which represent the degrees of load of the management jobs, and the degrees of similarity among the management jobs. This embodiment recommends a candidate for commonalization that is expected to increase the similarity degree and to reduce the management cost in view of the management costs of the management jobs and the similarity degrees among the management jobs.

As described above, the degree of the load of a management job can be expressed in management cost. However, with increase in similarity degree, or commonality, among management jobs, an administrator can efficiently perform the overall operation of a plurality of management jobs so that the total workload in the plurality of management jobs can be reduced. Accordingly, consideration of the similarity degrees among the management jobs in addition to the management costs of the individual management jobs leads to determining a change pair of management jobs that effectively reduces management works.

Before explaining a specific configuration of this embodiment, major terms used in this embodiment will be explained. A department is a division for grouping the managed apparatuses and typically a section in an organization. A department is to identify a group of apparatuses of management targets and does not need to correspond to the organization system of the users of the apparatuses. A management job is a minimum unit of work that an administrator performs in management of a group of apparatuses. The kinds of the management jobs are preliminarily defined. Examples of the management jobs are listed in FIG. 3, for example.

A management item is a category of a management job for grouping a plurality of management jobs; a management item includes a plurality of management jobs. A part of the management items may include only one management job. Typically, a plurality of management items are defined and all of the management items are commonly defined to all of the departments. Examples of the management items are listed in FIG. 3.

A management policy (refer to FIG. 3) defines a management job set to each management item in each department. The system administrator conducts the management job set to each management item specified by the management policy in the apparatuses belonging to each department.

An inter-job similarity degree is a numerical value indicating the similarity degree between management jobs in each management item. The inter-job similarity degree is determined within a management item and is not determined across different management items. In the configuration explained below, a similarity degree is preliminarily defined for each management job pair in a management item. As two management jobs are more similar to each other in their detail, a greater value is assigned.

An inter-department job similarity degree is a similarity degree between the jobs set to departments. A department-specific total job similarity degree is the total sum of the inter-department job similarity degrees by department. The similarity degree used in the example in the following description for explaining determination of a recommendation priority degree (recommendation degree) on a change pair of management jobs is a numerical value indicating the degree of commonality in management jobs for one administrator on one management item.

A management cost is a degree of load to an administrator in performing a management job. In a preferred configuration described below, the management cost is calculated from operation logs of the administrator. The operation log is information that indicates the state of the administrator in performing a management job. Preferably, it includes operation history of a computer for the administrator in performing the management job, changes in the internal state of the management server computer, and the passage of time. The operation log may include measurements indicating the physical and the mental states of the administrator.

Hereinafter, an example embodying this invention will be described with reference to FIG. 1 to FIG. 26. This embodiment describes a client management support system and a method thereof to support efficient asset management and security management on client computers in an enterprise having a plurality of departments.

FIG. 1 exemplifies a computer system 100 in this embodiment. In the computer system 100 in FIG. 1, an administrator's computer 10, client computers 20, and a server computers 30 are connected via a network. The computer system 100 includes one or more administrator's computers 10, one or more client computers 20, and one or more server computers 30. FIG. 1 exemplifies an administrator's computer 10, a plurality of client computers 20, and a server computer 30. The administrator's computer 10 and the server computer 30 constitute a management system.

The administrator's computer 10 is a computer to be used for the administrator to manage the client computers 20. The administrator's computer 10 comprises a primary storage device 119, a central control unit 120 of a processor, a secondary storage device 121, an output device 122, a communication interface 123, and an input device 124. The primary storage device 119 includes a user operation controller 101 of a program. The primary storage device 119 and the secondary storage device 121 can be regarded as a storage device. The output device 122 is, for example, a monitor or a printer.

The user operation controller 101 has a function to obtain an operation log of the administrator's computer 10 while the administrator is performing a management job. The obtained operation log is sent to the server computer 30 via the network to be recorded in a management job record storage part 108. The functions of the administrator's computer 10 may be implemented in the server computer 30.

The server computer 30 is a system for performing asset management and security management of client computers 20 and has a function of a client management support system. As shown in FIG. 1, the server computer 30 comprises a primary storage device 129, a central control unit 125 of a processor, a secondary storage device 130, an output device 126, a communication interface 127, and an input device 128. The primary storage device 129 and the secondary storage device 130 can be regarded as a single storage device. The output device 126 is, for example, a monitor or a printer.

The primary storage device 129 includes a management cost calculator 102, a similarity degree calculator 103, a commonalization recommender 104, a commonalization effect presenter 105, and a client manager 106. These are programs. A part of these programs may be executed in another computer included in the management system.

The secondary storage device 130 includes a management policy storage part 107, a management job record storage part 108, a management cost calculation record storage part 109, a job-specific management cost storage part 110, an inter-job similarity degree storage part 111, an inter-department job similarity degree storage part 112, a calculated similarity degree storage part 113, a management job change pair storage part 114, a commonalization recommendation storage part 115, a commonalization effect storage part, a department information storage part 117, and a management job trigger storage part 118.

These storage parts 107 to 118 are storage areas for storing relevant information. Namely, the storage parts 107 to 118 store information on management policy, management job record, management cost calculation record, job-specific management cost, inter-job similarity degree, inter-department job similarity degree, calculated similarity degree, management job change pair, commonalization recommendation, commonalization effect, department, and management job trigger.

FIG. 1 shows the programs in the primary storage devices 119 and 129 for convenience of explanation; typically, a program is loaded from a storage area of the secondary storage device 121 or 130 to a storage area of the primary storage device 119 or 129. The secondary storage devices 121 and 130 are storage devices including non-volatile non-transitory storage media for storing programs and data required for implementing intended functions. The secondary storage devices 121 and 130 may be external storage devices connected via a network.

The central control units 120 and 125 provide predetermined functions by executing programs stored in the primary storage devices 119 and 129. The programs to be executed include not-shown operating systems (OSs) in addition to the programs shown in FIG. 1. The central control units 120 and 125 may include a plurality of chips and a plurality of packages.

The programs are executed by the central control units 120 and 125 to perform predetermined processing using the primary storage devices 119 and 129 and the communication interfaces 123 and 127. Accordingly, the explanations in this embodiment having the subjects of "program" may be replaced with those having the subjects of central control unit 120 or 125. Processing performed by a program is processing executed by the computer 10 or 30 or the computer system 100 on which the program runs.

In other words, the central control unit 120 works as the user operation controller and the central control unit 125 works as the management cost calculator 102, the similarity degree calculator 103, the commonalization recommender 104, the commonalization effect presenter 105, or the client manager 106.

The management cost calculator 102 has a function of calculating management costs of an administrator with reference to the operation logs in the administrator's computer 10. The similarity degree calculator 103 has a function of calculating similarity degrees between management policies for the plurality of departments assigned to an administrator (between set management jobs).

The commonalization recommender 104 has a function of creating commonalization recommendations on management policies (set management jobs) to reduce the management costs of an administrator in view of the management costs and the similarity degrees. The commonalization recommender 104 also has a function of calculating a similarity degree after achieving the commonalization and a priority degree of recommendation on the commonalization for a created commonalization recommendation.

The commonalization effect presenter 105 has a function of calculating an effect of a commonalization recommendation after changing management policies in accordance with the commonalization recommendation. The effect of a commonalization recommendation is a change in management cost of the administrator owing to the change of management policy. The commonalization effect presenter 105 also has a function of put the management policy back to the one prior to the change in case the management cost might increase because of the change of management policy in accordance with the commonalization recommendation. Furthermore, the commonalization effect presenter 105 has a function of presenting an additional commonalization recommendation in the case where the management cost is reduced because of the change of management policy in accordance with the commonalization recommendation.

The client manager 106 has a function of monitoring client computers 20 connected to the network and managing asset conditions and security conditions. The client manager 106 also has a function of storing logs regarding execution of management jobs in the management job record storage part 108 while performing management jobs for asset management and security management.

The management policy storage part 107 holds management policies for asset management and security management in each department in an enterprise, as exemplified in FIG. 3. The management policies are configured to contain data regarding departments (T01), management job IDs (T02), management items (T03), and management jobs (T04). The management policies include information indicating which management job (T04) is to be performed in each department (T01) regarding a given management item (T03).

A management job ID (T02) is identification information unique to a combination of a management item (T03) and a management job (T04). In this description, a name or a number can be used as identification information to identify a target, in addition to the ID and they can be replaced with one another.

The management job record storage part 108 holds operation logs when management jobs are performed, as exemplified in FIG. 7. The management job records are configured to contain data regarding management job record IDs (T08), administrators (T05), departments (T01), management items (T03), management job IDs (T02), number of departments under concurrent operation (T09), and operation logs (T10). The number of departments under concurrent operation (T09) indicates the number of departments where a management job is commonly performed in a batch. It should be noted that FIG. 7 contains the start times and the end times of management jobs for the operation logs (T10).

The management cost calculation record storage part 109 holds management costs relating to the individual records in the management job record storage part 108. The management cost calculation records are configured to contain data regarding departments (T01), management items (T03), management job IDs (T02), management job record IDs (T08), and management costs (T11). A management cost (T11) is calculated by the management cost calculator 102 based on the operation log associated with a management job record ID (T08) in the management job records.

The job-specific management cost storage part 110 holds the averages of the item-specific and department-specific management costs under the current management policies for each administrator as aggregate information of the management cost calculation records stored in the management cost calculation record storage part 109, as exemplified in FIG. 10. The job-specific management costs are configured to contain data regarding administrators (T05), departments (T01), management items (T03), item-specific average management costs (T16), management job IDs (T02), and department-specific average management costs (T12).

A department-specific average management cost (T12) is the average of the management costs of a management job in a management department for an administrator and is calculated based on the information in the management policy storage part 107 and the management cost calculation record storage part 109. Specifically, the department-specific average management cost is the average of the management costs (T11) of the management job records on a management job in the management cost calculation record storage part 109. The calculation of the average may use only a part of the management job records in the management cost calculation record storage part 109. The calculation of the average may use a weighting factor other than a simple average.

An item-specific average management cost (T16) is the average of the department-specific average management costs (T12) on a management item for an administrator. Namely, the item-specific average management cost (T16) for a management item is the average of the department-specific average management costs (T12) in all departments for the management item.

The inter-job similarity degree storage part 111 stores information regarding similarity degrees between management jobs by management item to which the management jobs belong. The similarity degrees between management jobs are predetermined in consideration of actual operations and sequences in performing the management jobs. In this example, the similarity degree 100 means that the two management jobs are identical. The similarity degree 0 means that the two management jobs are completely different.

The values of the inter job similarity degrees may be occasionally updated based on the operation logs obtained from the user operation controller 101 and the client manager 106. The inter-job similarity degrees are configured to contain data regarding the management item (inventory counting in the example of FIG. 12), combinations of management jobs, and similarity degrees between management jobs.

The inter-department job similarity degree storage part 112 stores similarity degrees in management jobs between departments of the same administrator, as exemplified in FIG. 13. The similarity degrees between management jobs are held in the inter-job similarity degree storage part 111. In the example of FIG. 13, the inter-department job similarity degree storage part 112 includes information on the total sums of inter-department job similarity degrees between each department and the other departments as the department-specific total job similarity degrees (T13). The inter-department job similarity degrees are configured to contain data regarding the administrator (T05), the management item (T03), combinations of departments, and department-specific total job similarity degrees (T13).

The calculated similarity degree storage part 113 stores similarity degrees on management items by administrator as exemplified in FIG. 14. The calculated similarity degrees are configured to contain data regarding administrators (T05), management items (T03), and similarity degrees (T14). A similarity degree (T14) is calculated by the similarity degree calculator 103 based on the information in the management policy storage part 107. The details of the similarity degree (T14) will be described later, but the similarity degree (T14) indicates the average of inter-department job similarity degrees on a management item for an administrator (refer to FIG. 13).

The management job change pair storage part 114 stores management costs before the change and similarity degrees before and after the change in the case where management jobs of an administrator are changed, as exemplified in FIG. 16. The management costs before change (T17) are average management costs of management jobs before changing (current) policies in individual management departments an administrator is in charge of. In the example of the following description, the management costs before change (T17) are the department-specific average management costs (T12) before change.

The information on management job change pairs is configured to contain data regarding management job change pair IDs (T15), administrators (T05), management items (T03), departments (T01), management job IDs (T02), management costs before change (T17), similarity degrees (T14), and priority degrees (T18). Regarding the management job IDs (T02) and the similarity degrees (T14), it stores calculated values before and after changing management jobs (management policies).

The commonalization recommendation storage part 115 holds information about the recommendations to be displayed in a commonalization recommendation window (FIG. 18), as exemplified in FIG. 17. The commonalization recommendations are configured to contain data regarding departments (T01), management items (T03), management job change IDs (T15), item-specific average management costs (T16), and priority degrees (T18). A priority degree indicates the degree of recommendation for a change of management jobs. The higher the priority degree is, the more reduction in management cost can be expected, so that the change of the management jobs is highly recommended.

The commonalization effect storage part 116 holds similarity degrees and item-specific average management costs before and after changing policies by commonalization, which are to be displayed in a commonalization effect presentation window (FIG. 26), as exemplified in FIG. 24. The commonalization effects are configured to contain data regarding departments (T01), management items (T03), effects indicating increase or decrease in management cost by changing management jobs (T20), and further, management job IDs (T02), similarity degrees (T14), and total management costs (T17) before and after the change.

The department information storage part 117 holds information on administrators of individual departments, as exemplified in FIG. 4. The department information is configured to contain data regarding departments (T01) and administrators (T05).

The management job trigger storage part 118 holds internal events to be triggers of starts and ends of individual management jobs, as exemplified in FIG. 6. The management job triggers are configured to contain data regarding management job IDs (T02), start triggers (T06), and end triggers (T07).

In this embodiment, the information used by the management system does not depend on the data structure but may be expressed in any data structure. For example, a data structure appropriately selected from table, list, database, and queue can store the information. Information is stored in a data storage area in a data storage apparatus.

Hereinafter, procedures of recommending commonalization of management policies (management jobs set to the departments) and presenting effects of the commonalization will be explained with reference to the accompanying drawings. The procedures are executed by the management system having the configuration in the foregoing description to achieve reduction in management cost of client management. In this description, recommending commonalization (FIG. 2 to FIG. 20) will be explained first and then presenting effects of the commonalization (FIG. 21 to FIG. 26).

Recommending Commonalization

Figure 2:
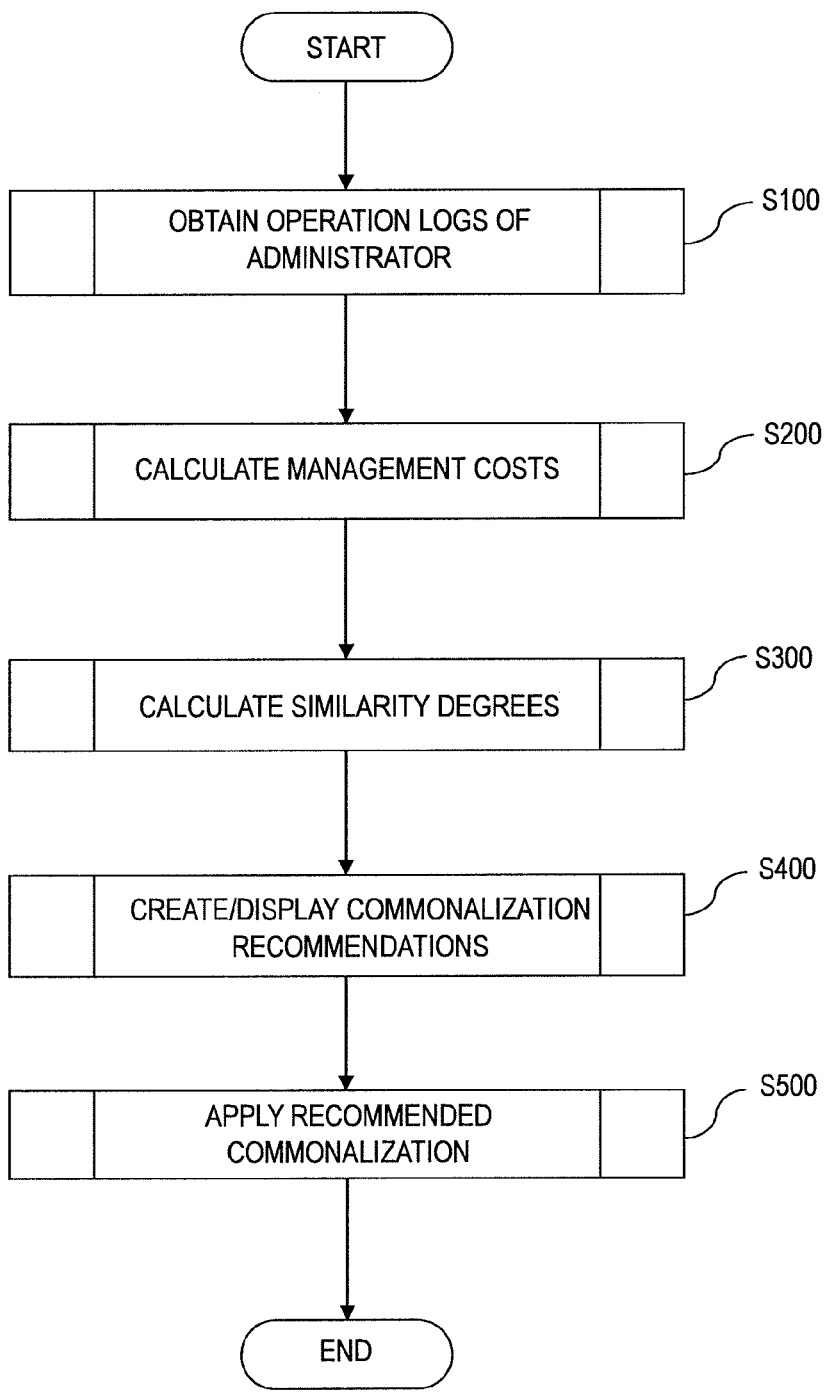
FIG. 2 is a flowchart illustrating a process of recommending commonalization of this embodiment.

First, the outline of recommending commonalization will be described with reference to FIG. 2. The recommending commonalization includes five processes: obtaining operation logs of an administrator (S100), calculating management costs (S200), calculating similarity degrees (S300), creating and displaying recommendations for commonalization (S400), and applying recommended commonalization (S500).

Every time an administrator performs a management job, the management system obtains an operation log from the start to the end of the management job and accumulates the operation logs (S100). When the administrator requests recommendations for commonalization, it calculates the management cost of each performed management job with reference to the accumulated operation logs (S200).

The management system calculates a similarity degree on each management item (S300) based on the management policies for the departments taken charge of by the administrator. The similarity degree on a management item is calculated by management item for an administrator and is an index of uniformity of the management jobs assigned to the administrator. The similarity degree on a management item is calculated from the similarity degrees among the management jobs prepared for the management item in different departments; the example described below uses the average of the inter-job similarity degrees. The management system creates a recommendation for commonalization based on the calculated management costs and the similarity degrees and displays it (S400). Moreover, if the administrator requests change of management policy in response to the recommendation for commonalization, the management system updates the management policies in accordance with the change request (S500).

The management policies are configured as shown in FIG. 3, for example, and are held in the management policy storage part 107. For example, when the management item (T03) of "software upgrading" becomes necessary to be performed, the management job of "automatically install the latest version immediately" is performed on the client computers owned by the department A, and the management job of "distribute the latest version of installer immediately" is performed on the client computers owned by the department C. In this way, the administrator can obtain the difference in management policy among departments with reference to the information in the management policy storage part 107.

The department information is configured as shown in FIG. 4, for example, and is stored in the department information storage part 117. FIG. 4 is an example in which a department is assigned to an administrator, but a different condition may be assumed in which the administrators take charges of a plurality of departments different from those others.

Figure 5:
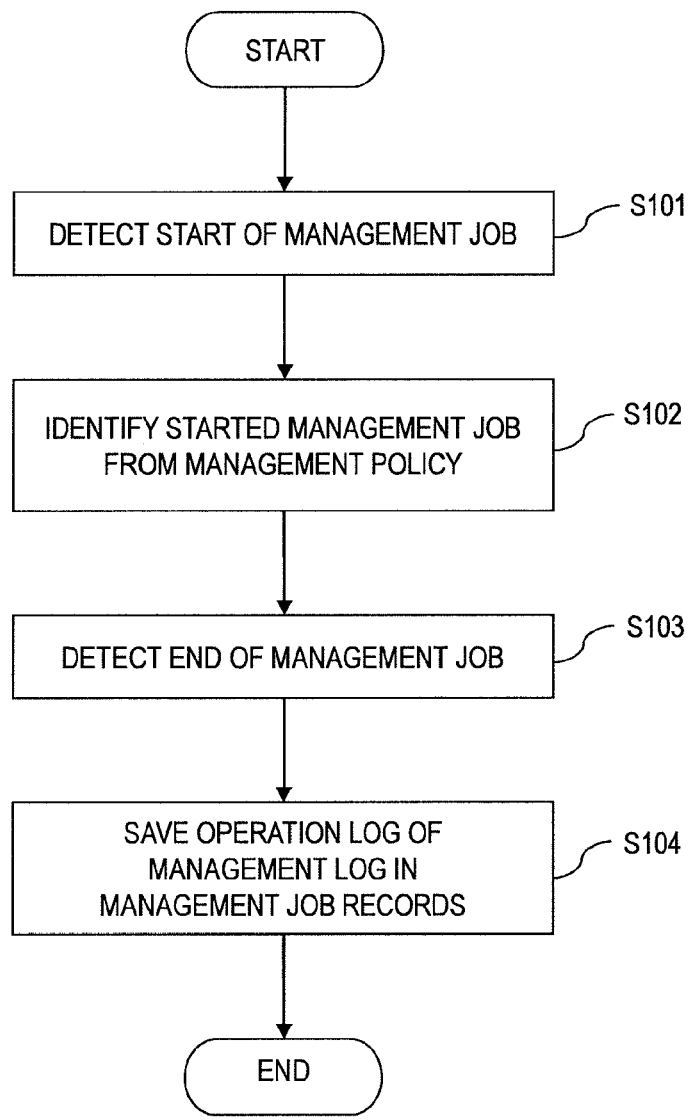
FIG. 5 is a flowchart illustrating details of the step of obtaining an operation log in the flowchart of FIG. 2.

Next, with reference to FIG. 5, details of the obtaining operation logs of an administrator (S100) will be explained. First, the user operation controller 101 or the client manager 106 detects start of a management job (S101). When an interaction from the administrator (in the user operation controller 101) or internal processing (in the client manager 106) is detected, start of a management job is detected with reference to the information in the management job trigger storage part 118.

The management job triggers are configured as shown in FIG. 6, for example. For start triggers (T06) and end triggers (T07), the events of internal processing or user interactions which are determined to be the triggers of the start and the end of management jobs are specified.

Examples of events in the internal processing may include "complete distribution of software to all the designated client computers" and "complete import of all asset data". Examples of events from the user interactions may include "push the button to start exporting asset data".

The user operation controller 101 or the client manager 106 refers to the start triggers (T06) and the end triggers (T07) in the management job trigger storage part 118 every time it detects an event concerning internal processing or a user interaction to check whether the event indicates the start or the end of a management job.

In the case where the user operation controller 101 or the client manager 106 detects a start or an end of a management job (S101 or S103), it refers to the management policy storage part 107 and finds the management policy associated with the management job from the management job ID and the administrator performing the job (S102).

When the user operation controller 101 or the client manager 106 detects an end of a management job, it saves the operation log of the management job to the management job record storage part 108 (S104). Management job records are saved as those shown in FIG. 7, for example. The example of the management job records shown in FIG. 7 indicates that the departments A to F simultaneously (not in a batch) started inventory counting and the department C completed the job at the earliest time and the department E took the longest time to complete the job.

A preferred configuration of this embodiment stores the start time and the end time of a management job as an operation log, but the system may store different information instead of this information or in addition to this information as the operation log. For example, the system may measure the number of clicks of a mouse or touches to a keyboard by the administrator or information on motion of line of sight of the administrator using device information or a sensing technique and store the information. Such information may be indices to indicate the workload of the administrator on management jobs.

Figure 8:
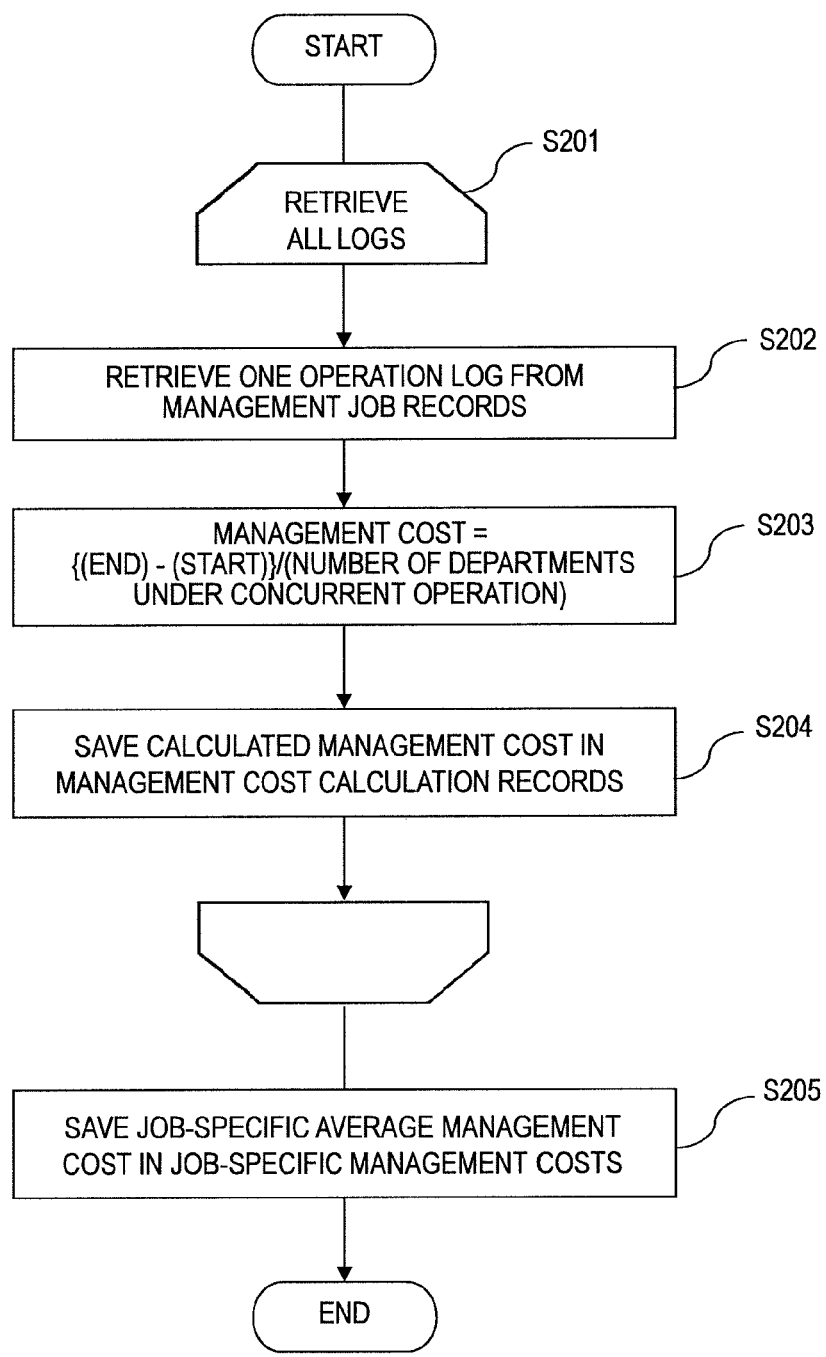
FIG. 8 is a flowchart illustrating details of the step of calculating management costs in the flowchart of FIG. 2.

Next, details of the calculating management costs (S200) will be described with reference to FIG. 8. The calculating is performed by the management cost calculator 102. The management cost calculator 102 retrieves a management job record from the management job record storage part 108 (S202). The management cost calculator 102 calculates the management cost based on the management job record (S203).

Noting the operation time necessary for performing a management job for an aspect of the load of an administrator, this embodiment uses the following formula that defines the time required from the start to the end of a management job as the management cost:

$$\text{Management cost} = \{(\text{end time}) - (\text{start time})\} / (\text{number of departments under concurrent operation})$$ (Formula 1)

The calculated management cost is saved in the management cost calculation record storage part 109 (S204). The management cost calculator 102 performs this processing on all of the management job records stored in the management job record storage part 108 (S201). For example, results of calculation based on the management job records shown in FIG. 7 to obtain the management cost calculation records are shown in FIG. 9.

Each of the management cost calculation records are linked with each record in the management job record storage part 108 by the management job record ID (T08). In this embodiment, the management costs (T11) are calculated by the foregoing Formula 1 from the start times and the end times of the management job in the management job records.

The management cost may be defined using another operation log obtained from other device information or by other sensing technique on the administrator's side. In the case where a different management cost is defined for each management item, conversion is performed so that each management cost can be compared with one another.

The management cost calculator 102 calculates management cost calculation records on all of the management job records. Then, the management cost calculator 102 calculates department-specific average management costs (T12) based on the information in the management cost calculation record storage part 109 and stores them in the job-specific management cost storage part 110.

Specifically, in calculating a department-specific average management cost (T12) for a management item in a department, the management cost calculator 102 calculates the average of the management costs for the management item in the department obtained from the management cost calculation record storage part 109.

For the management cost calculation records to be used in calculating the department-specific average management cost (T12), the management cost calculation records in the management job records obtained in the latest specific time period may be used. All of the entries in the management cost calculation records may be used. In this example, the average is a simple average but may be a weighted average, or any other calculation method may be used.

For example, the job-specific management costs calculated from the management cost calculation records shown in FIG. 9 are shown in FIG. 10. The averages of the department-specific average management costs (T12) by management item are calculated and are stored as the item-specific average management costs (T16).

Figure 11:
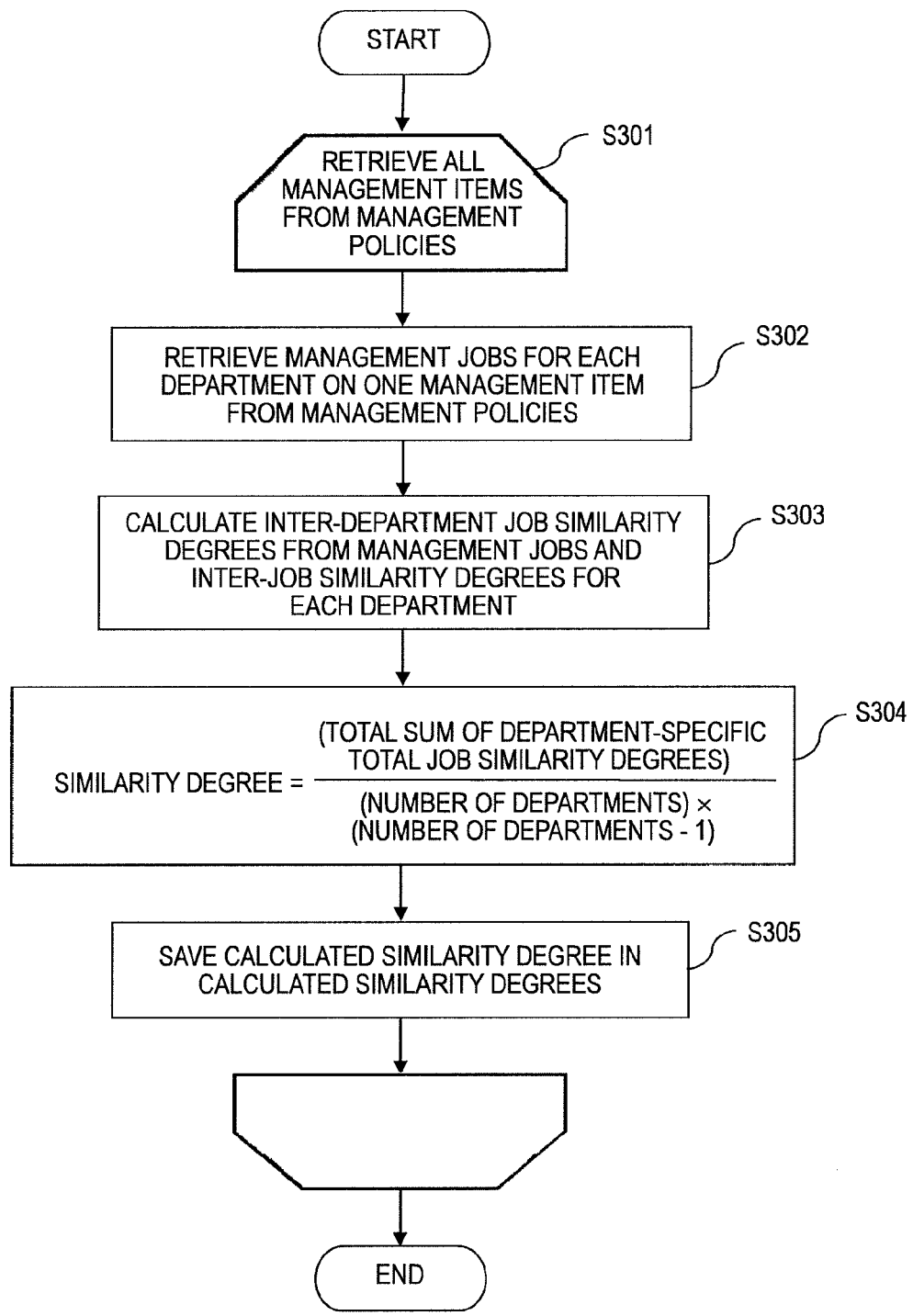
FIG. 11 is a flowchart illustrating details of the step of calculating similarity degrees in the flowchart of FIG. 2.

Next, details of the calculating similarity degrees (S300) will be described with reference to FIG. 11. The calculation is performed by the similarity degree calculator 103. The similarity degree calculator 103 retrieves the management policies from the management policy storage part 107 and calculates similarity degrees by management item. The similarity degree calculator 103 first selects a management item and finds the management jobs in each department (S302).

Next, the similarity degree calculator 103 retrieves inter-job similarity degrees on the management item shown in FIG. 12 from the inter job similarity degree storage part, checks the management jobs in each department to determine the similarity degrees between departments as the similarity degrees between relevant management jobs, creates the inter-department job similarity degrees shown in FIG. 13, and stores them in the inter-department job similarity degree storage part 112 (S303).

In FIG. 12, the similarity degree 100 means that the two management jobs are identical. The similarity degree 0 means that the two jobs are completely different and completely unlike. The greater the value, the higher the similarity degree. For example, the example of FIG. 12 indicates that the job of the INVENTORY02 is different from but similar to the job of the INVENTORY03 and that the job of the INVENTORY01 is completely different from and completely unlike the job of the INVENTORY02 or the INVENTORY03.

Corresponding to this, FIG. 13 indicates that the similarity degrees among the departments D, E, and F to which the management job INVENTORY02 or 03 is designated are relatively high, and that the similarity degrees among the departments A, B, and C to which the INVENTORY01 is designated are high. The similarity degree calculator 103 calculates a department-specific total job similarity degree, which is the total sum of similarity degrees with the other departments, on each department and stores it in the inter-department job similarity degree storage part 112.

Next, the similarity degree calculator 103 calculates the similarity degree on the management item (S304). The similarity degree is an index of uniformity of set management jobs and is calculated on each management item for an administrator. This embodiment determines the similarity degree on a management item using the following formula for calculating the average inter-department job similarity degree among the departments.

$$\text{Similarity degree} = \text{(total sum department-specific total job similarity degrees)}/\{\text{(the number of departments)} \times \text{(the number of departments} - 1)\} \quad \text{(Formula 2)}$$

The total sum of the department-specific total job similarity degrees is equal to the total sum of all of the inter-department similarity degrees on the target management item (the similarity degrees between management jobs set to all departments) and the similarity degree is equal to the average value for the total sum of all of the inter-department similarity degrees.

The similarity degree calculator 103 saves the calculated similarity degree on each management item to the calculated similarity degree storage part 113 (S305). The similarity degree calculator 103 performs this similarity degree calculation on all combinations of the administrators and management items stored in the management policy storage part 107 (S301). For example, the similarity degree on the inventory counting for the administrator X calculated from the inter-job similarity degrees on the management item of the inventory counting in FIG. 12 and the inter-department job similarity degrees on the inventory counting for the administrator X in FIG. 13 is shown in FIG. 14.

Figure 15:
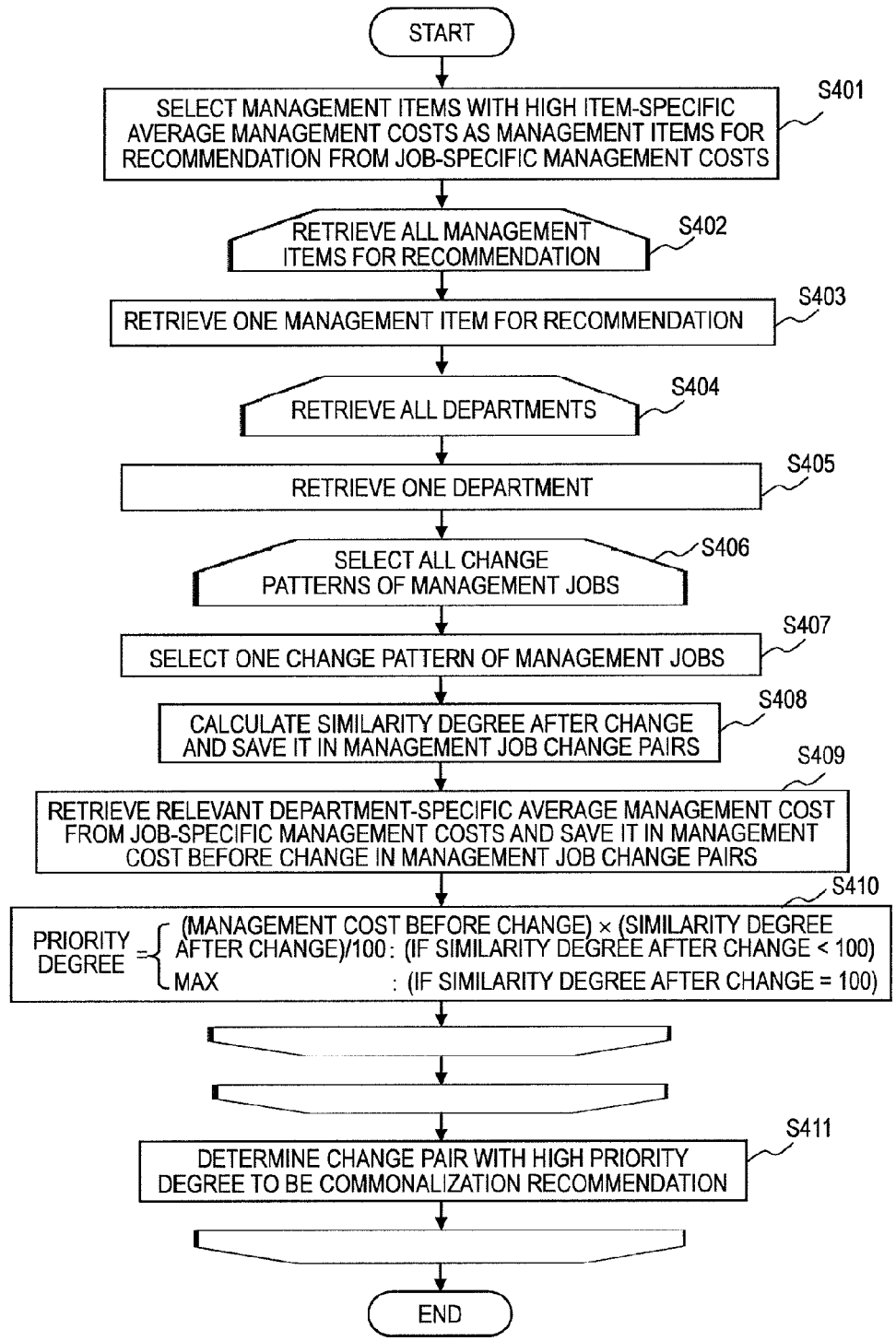
FIG. 15 is a flowchart illustrating details of the step of creating/displaying commonalization recommendations in the flowchart of FIG. 2.

Next, details of the creating/displaying recommendations for commonalization (S400) will be described with reference to FIG. 15. This process is performed by the commonalization recommender 104. The commonalization recommender 104 selects management items with high item-specific average management costs as management items for recommendation and creates recommendations for change to commonalize the management policies on each management item for recommendation.

Specifically, the commonalization recommender 104 refers to the job-specific management cost storage part 110 and selects management items with high item-specific average management costs as the management items for recommendation (S401). For example, it selects a predetermined number of management items in decreasing order of item-specific average management cost. The commonalization recommender 104 performs the following processing on all of the selected management items for recommendation (S402). The similarity degree on the management item (refer to Formula 2) may be used as the basis of selecting the management items for recommendation instead of or in addition to the management cost of the management item.

The commonalization recommender 104 changes management jobs (S407) for a department (S405) on each management item for recommendation (S403) and determines a priority degree of recommendation (recommendation degree) on each change pattern based on the similarity degree after the change and the current management cost. The change pattern means a pair of a management job at the time of recommending commonalization and a management job after the change of the job.

Specifically, the commonalization recommender 104 first calculates the similarity degree after changing the management job in accordance with the change pattern and saves it in the management job change pair storage part 114 (S408). Next, the commonalization recommender 104 retrieves the relevant department-specific average management cost (T12) from the job-specific management cost storage part 110 and saves it in the management job change pair storage part 114 as a management cost before change (T17) (S409).

Next, the commonalization recommender 104 calculates a priority degree, which is to be the reference for the priority of recommendations, from the obtained similarity degree after change and the management cost before change (T17) and saves it in the management job change pair storage part 114 (S410). This priority degree is a value indicating the degree of increase in the similarity degree after the change in comparison with the one before the change and the degree of decrease in the management cost after the change.

This embodiment aims at raising the priority degree on a change that causes the similarity degree of a management job with a high management cost before change to get closer to 100% after the change and applies the following formula: (Formula 3)

In the case where the similarity degree after the change is less than 100, $$\text{Priority degree} = \text{(management cost before change)} \times \text{(similarity degree after change)}/100$$

In the case where the similarity degree after the change is 100, $$\text{Priority degree} = \text{MAX}$$

The commonalization recommender 104 repeats the processing up to this step, the steps 407, 408, 409, and 410, for all of the departments (S404) and for all of the change patterns of management jobs (S406) with respect to a management item. In a preferred configuration, the commonalization recommender 104 stores only the information on management job change pairs with high priority out of all of the management job change pairs calculated in the preceding steps in the commonalization recommendation storage part 115 as recommendations for commonalization on the management item for recommendation. Otherwise, it may store all information.

FIG. 16 shows an example of management job change pairs regarding inventory counting calculated using the management cost calculation records of FIG. 9 and the calculated similarity degrees of FIG. 14. For example, the record with the management job change pair ID "X-A:INVENTORY01-02" includes information on similarity degree and others in the case where the management job for the department A in the management policies of FIG. 3 is changed from the previous INVENTORY01 to a new INVENTORY02.

The commonalization recommender 104 calculates a similarity degree after change by the above-mentioned Formula 2 using an inter-department job similarity degree with the change applied (FIG. 13). In this example, the similarity degree after change increases. In view of the nature of the similarity degree, if the management jobs before and after change in the pair are the same, the similarity degrees before and after the change are equal.

FIG. 17 shows an example of top three recommendations for commonalization in priority degree collected from those of FIG. 16. The recommendation with the highest priority degree is the one "the management job performed in the department D: Change INVENTORY02 to INVENTORY01".

Figure 18:
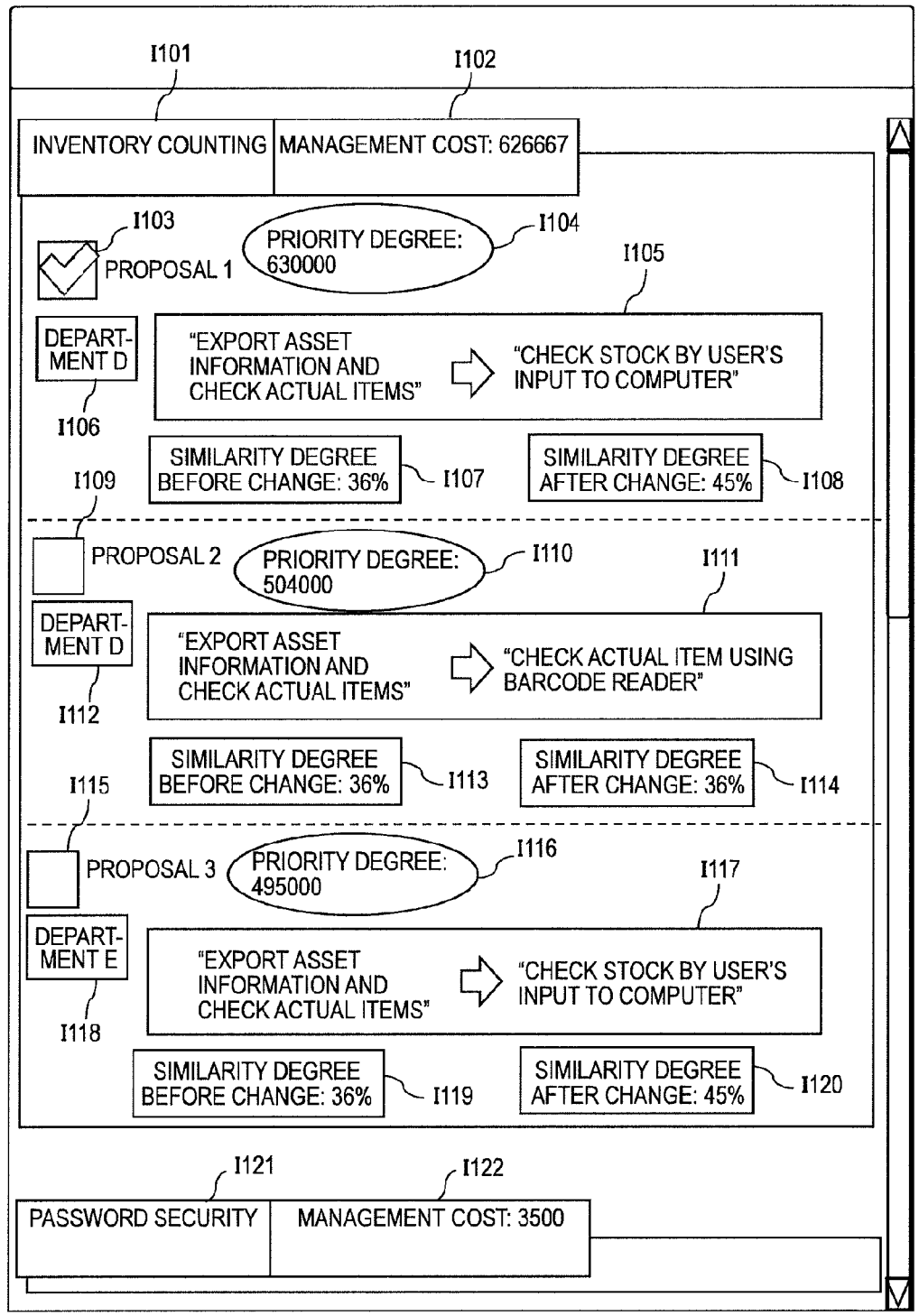
FIG. 18 is a view exemplifying a commonalization recommendation window in this embodiment.

Next to this recommendation, the priority degrees of "the management job performed in the department D: change INVENTORY02 into INVENTORY03" and "the management job performed in the department E: change INVENTORY02 into INVENTORY01" follow in this order. FIG. 18 is an example of a recommendation window configured in accordance with the recommendations in FIG. 17. For example, the output device 126 or the output device 122 displays this drawing. The recommendation window displays, in the management items for recommendation (I101 and I121), recommendations in descending order of the item-specific average management cost (I102 and I122). The recommendation window presents three recommendations for commonalization (I105, I111, and I117) with high priority degrees for each management item for recommendation.

FIG. 18 shows an example of changing the inventory counting (I101). The recommended pairs for commonalization are displayed in descending order of the priority degree (I104, I110, and I116) and the recommendation window shows a predetermined number (three in the example of FIG. 18) of pairs in changing management jobs selected in descending order of the priority degree. Depending on the design, all pairs on which the priority degrees are calculated may be displayed.

The recommendations for commonalization (proposals of pairs for management job change) display the similarity degrees before change (I107, I113, and I119) and the similarity degrees after the change (I108, I114, and I120). By checking a checkbox (I103, I109, or I115), the designated change is performed. The information displayed in the recommendation window may be selected appropriately depending on the design.

Figure 19:
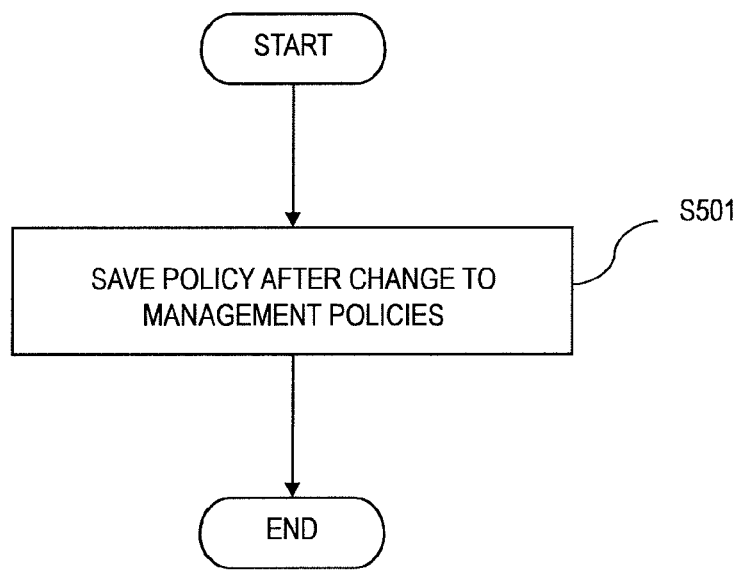
FIG. 19 is a flowchart illustrating details of the step of applying a commonalization recommendation in the flowchart of FIG. 2.

Next, with reference to FIG. 19, details of applying recommended commonalization (S500) will be described. This process is performed by the commonalization recommender 104. The commonalization recommender 104 saves the change in the management policy storage part 107 in accordance with the details of the change for commonalization designated in the commonalization recommendation window by the administrator (S501).

For example, as shown in FIG. 18, if the administrator designates the proposal 1 for change for commonalization regarding the inventory counting through the input device 128 or the input device 124, the commonalization recommender 104 updates the management policy storage part 107 (FIG. 3) to the one shown in FIG. 20. Specifically, the commonalization recommender 104 changes the management job ID (T02) on the management item (T03) of "inventory counting" for the department D into "INVENTORY01", and further updates the management job (T04) together with the change of the management job ID.

Presenting Effects of Commonalization

Figure 22:
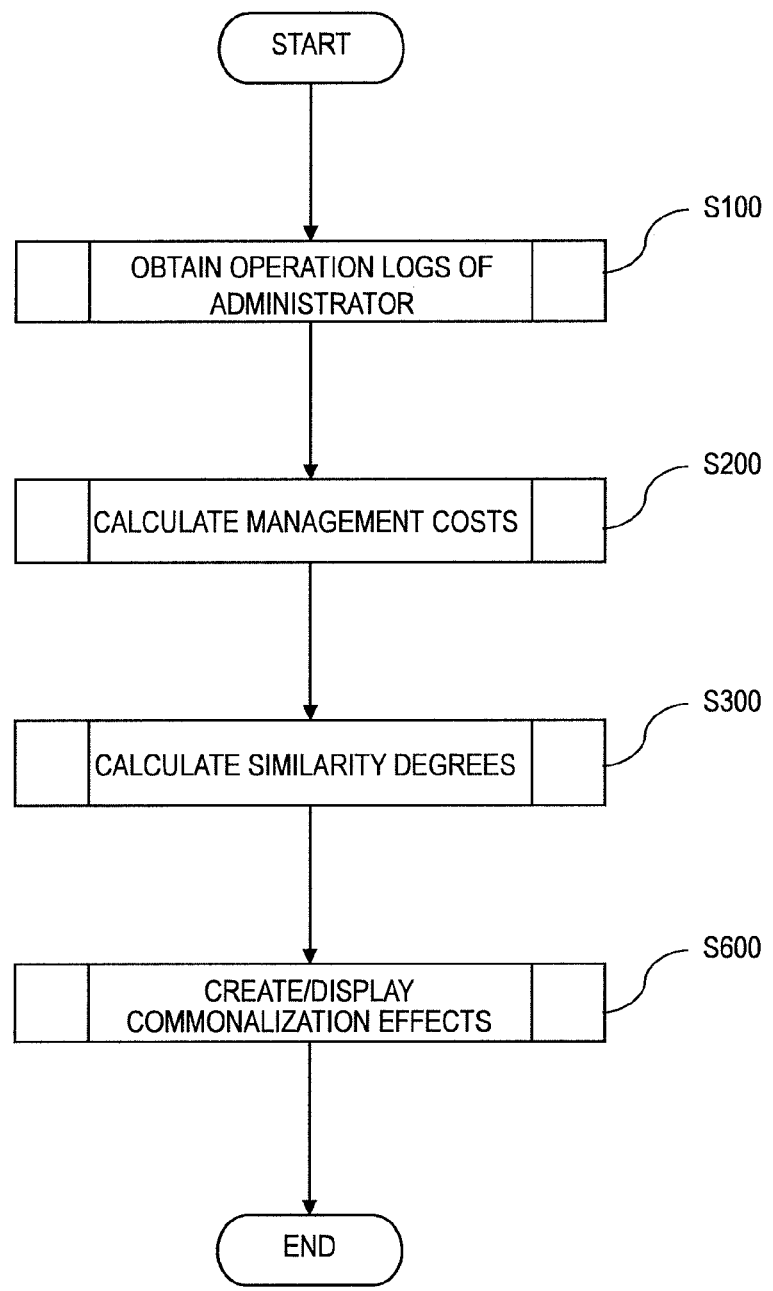
FIG. 22 is a flowchart illustrating a process of presenting effects of commonalization of this embodiment.

First, with reference to FIG. 22, the outline of presenting effects of commonalization will be explained. The presenting effects of commonalization includes four processes: obtaining operation logs of an administrator after changing management jobs (S100), calculating management costs (S200), calculating similarity degrees (S300), and creating and displaying commonalization effects (S600). The details of the obtaining operation logs of an administrator (S100), the calculating management costs (S200), and the calculating similarity degrees (S300) are the same as those in the above-described recommending commonalization; accordingly, explanations on them are omitted.

After changing management policies (set management jobs) in accordance with a commonalization recommendation, the changed management job is performed. FIG. 21 exemplifies an updated management job record storage part 108. In FIG. 21, the record added to the lower part with the management job record ID "X-D:INVENTORY01-1" is the particular record.

Figure 23:
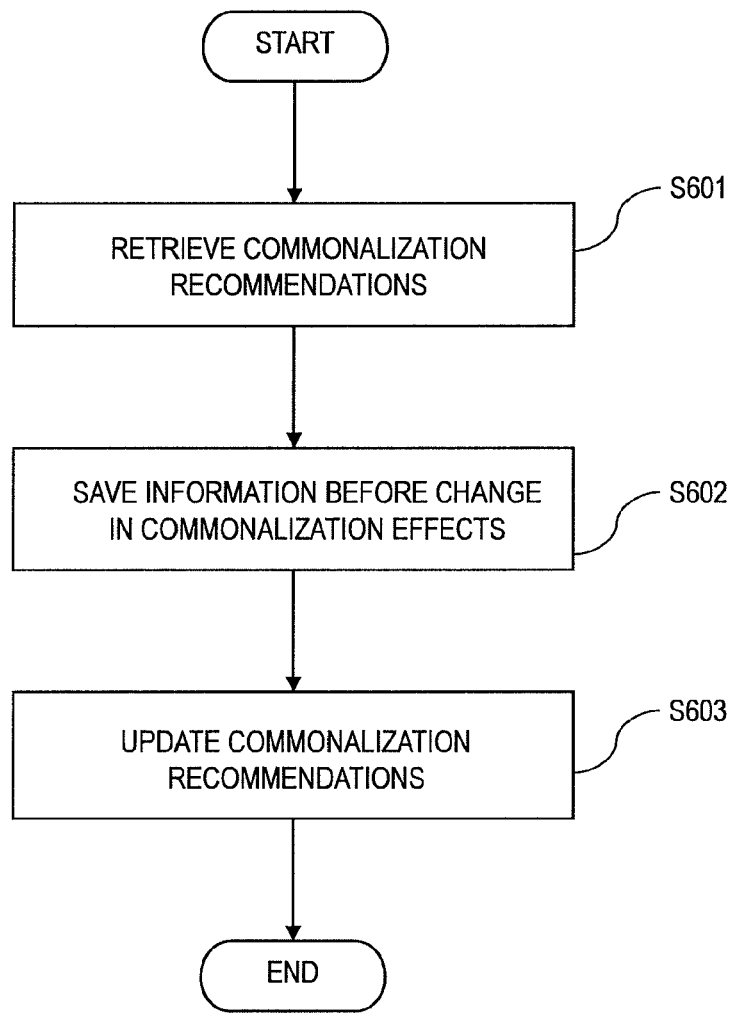
FIG. 23 is a flowchart illustrating details of the step of creating/displaying commonalization effect in the flowchart of FIG. 22.

Next, with reference to FIG. 23, details of the creating and displaying commonalization effects (S600) will be described. This process is performed by the commonalization effect presenter 105. The commonalization effect presenter 105 first retrieves the commonalization recommendations on the management job which were created at previous recommending commonalization, if any, from the commonalization recommendation storage part 115 by referring to the department (T01) and the management item (T03) (S601).

In FIG. 17, an entry with "Department D" and the management job change ID of "X-D:INVENTORY02-01" is specified. The commonalization effect presenter 105 refers to the management job change pair storage part 114 (FIG. 16) with this management job change ID. The commonalization effect presenter 105 can obtain the management job ID (T02), the similarity degree (T14), the management cost (T17) before change. The commonalization effect presenter 105 also can obtain the management job ID (T02) at present (after change). By this step, the current item-specific average management cost (T16) and the current similarity degree (T14) have already been calculated at S200 and S300 in FIG. 22.

The commonalization effect presenter 105 saves the management job IDs, the similarity degrees, and the item-specific average management costs before and after the change in the commonalization effect storage part 116 as information before and after the change (S602). FIG. 24 shows a result of creation of a commonalization effect of the "inventory counting" on which the management job was changed, with respect to the management job change pairs before in FIG. 16.

The effect (T20) shows one of the evaluations U (Up), K (Keep), and D (Down) depending on the change in item-specific average management cost between before and after the change. As shown in FIG. 24, the item-specific average management cost decreases in this example, the evaluation is determined to be "U".

Moreover, the commonalization effect presenter 105 recalculates the management job change pairs assuming that the current conditions are conditions before change, and saves the result in the management job change pair storage part 114. The commonalization effect presenter 105 also updates the commonalization recommendation storage part 115 (S603). FIG. 25 shows the result of update of the management job change pairs with reference to the commonalization recommendations of FIG. 17 and the commonalization change information in FIG. 18 and FIG. 20.

Figure 26:
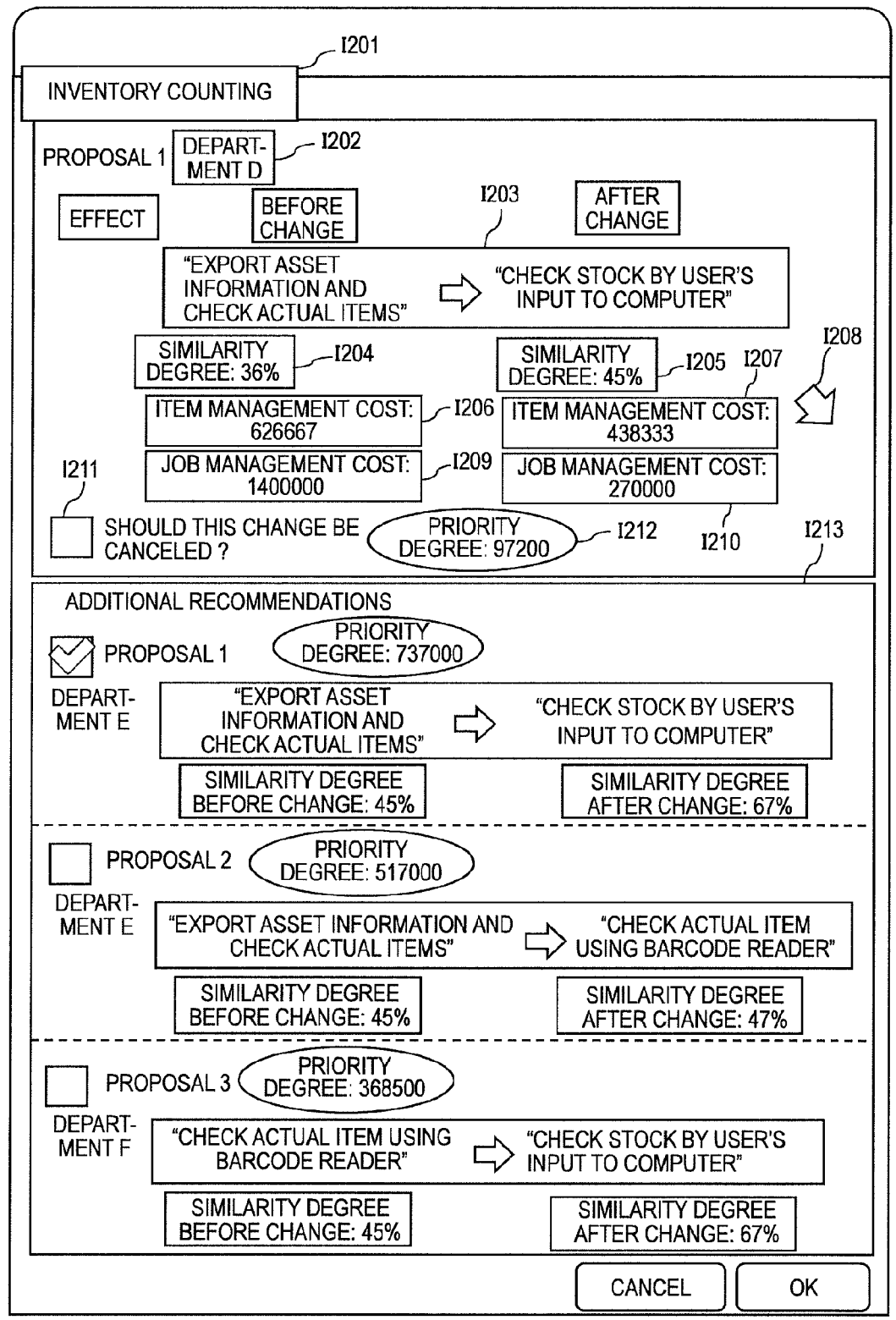
FIG. 26 is a view exemplifying a commonalization effect presentation window in this embodiment.

FIG. 26 exemplifies a commonalization effect presentation window based on the information of the commonalization effects of FIG. 24 and the management job change pairs of FIG. 25. The commonalization effect presenter 105 creates the data in the window. For example, the output device (typically a monitor) 126 or 122 displays this window. This window displays comparison results on the item-specific average management costs (I206, I207), the job-specific average management costs (I209, I210), and the similarity degrees (I204, I205) before and after the change for the department (I202).

The arrow I208 is displayed in accordance with the effect (T20) of the commonalization effect. In this example, the arrow I208 points downward to indicate reduction of the management cost. Moreover, an option is provided that selects the cancel of the change (I211) in case that the result of change is not preferable. If the administrator selects this option with the input device 128 or 124, the commonalization effect presenter 105 puts the changed management job back to the management job before the change. The commonalization effect presenter 105 re-changes the registered information on the management job in the management policies and the associated information with that on the management job before the change.

The commonalization effect presenter 105 further displays a priority degree (I212) for the change of the cancel in the window, with reference to the information in the management job change pair storage part 114. Moreover, this embodiment prepares additional recommendations for commonalization (I213). The commonalization recommendations are determined in accordance with the same processes as in the recommending commonalization, with reference to the information in the management job change pair storage part 114.

As described above, the configuration of this embodiment enables an administrator to commonalize management jobs at high management costs and to change management policies while checking the effects of the commonalization of the management jobs (management policies).

As set forth above, this invention has been described in detail with reference to the accompanying drawings; however, this invention is not limited to these specific configurations but includes various modifications and equivalent configurations within the scope of the appended claims. A part of this configuration of this embodiment may be added, deleted, or replaced by a different configuration. For example, the calculating and displaying effects of commonalization may be omitted.

For example, the above-described configuration uses the average of the similarity degrees among the management jobs set to the departments on a management item as the similarity degree on the management item, but the system may use a value obtained from the similarity degrees among the management jobs using a different calculation method as the similarity degree on the management item. For example, in the case where comparison of the similarity degrees among the management items is not performed, the total sum of the similarity degrees among the management jobs may be used.

Preferably, the system calculates the management cost of a management job from the information of an operation log as described above, but may use a preset default value. The above-described calculation of the priority degree uses the management cost before changing the management job, but the system may use an estimated management cost after the change instead of or in addition to it. For example, the system may determine the priority degree in accordance with the following formula:

Priority degree=(percentage of the management cost before change to the management cost after the change [%])/(100−(similarity degree after the change [%]) (Formula 4)

In the case where a management job record in the department after change does not exist for calculation, the calculating a priority degree may use a default value or management job records for a different department to obtain an estimated management cost after change. This formula indicates infinite if the similarity degree after change is 100% and the calculated priority degree becomes the maximum like foregoing Formula 3.

Preferably, the system calculates the priority degrees on all management job change pairs on the selected management items and departments as described above, but may calculate the priority degrees on a part of the pairs. Similarly, it may calculate the priority degrees on a part of the departments sequentially selected from the all. This invention can be applied to a system in which a management policy does not include a management item. This invention can be applied to management of management jobs for apparatuses included in one or more computer systems.

A part or all of the above-described configurations and functions may be implemented by hardware obtained by designing an integrated circuit, for example. The information such as programs, tables, and files that provide the functions may be stored in a storage device such as a non-volatile semiconductor memory, a hard disk drive, or an SSD, or a computer-readable non-transitory data storage medium such as an IC card, an SD card, or a DVD.

REFERENCE SIGNS LIST

10 Administrator's computer, 20 Client computer, 30 Server computer, 100 Computer system, 101 User operation controller, 102 Management cost calculator, 103 Similarity degree calculator, 104 Commonalization recommender, 105 Commonalization effect presenter, 106 Client manager, 107 Management policy storage part, 108 Management job record storage part, 109 Management cost calculation record storage part, 110 Job-specific management cost storage part, 111 Inter-job similarity degree storage part, 112 Inter-department job similarity degree storage part, 113 Calculated similarity degree storage part, 114 Management job change pair storage part, 115 Commonalization recommendation storage part, 116 Commonalization effect storage part, 117 Department information storage part, 118 Management job trigger storage part, 119 Primary storage device (administrator's computer), 120 Central control unit (administrator's computer), 121 Secondary storage device (administrator's computer), 122 Output device (administrator's computer), 123 Communication I/F (administrator's computer), 124 Input device (administrator's computer), 125 Central control unit (server computer), 126 Output device (server computer), 127 Communication I/F (server computer), 128 Input device (server computer), 129 Primary storage device (server computer), 130 Secondary storage device (server computer)

What is claimed is:

1. A management system for recommending changes of management jobs for a plurality of apparatuses included in one or more computer systems and separated into a plurality of groups, the management system comprising:

a processor;
a storage device, and
an output device,
wherein the storage device includes:
> inter-management-job similarity degree information including information on similarity degrees between a plurality of management jobs;
> management cost information including information on management costs for indicating degrees of load of the plurality of management jobs; and
> group management job information for indicating management jobs currently set to the plurality of groups, respectively, wherein the processor selects groups one by one from the plurality of groups, and, on each of the selected groups, performs:
> identifying a current management job set to the selected group with reference to the group management job information;
> determining a similarity degree among management jobs set to the plurality of groups after changing the current management job to a different management job with reference to the inter-management-job similarity degree information;
> determining at least either one of a management cost of the current management job and a management cost of the different management job with reference to the management cost information; and
> determining a recommendation degree of the change of the management job using the determined similarity degree and the determined management cost, and wherein the processor further creates information for presenting a pair for a recommended change of management jobs and a recommended priority degree of the change of the management job in accordance with the determined recommendation degrees in the groups selected one by one;
wherein the processor uses logs of the management system collected on the management job to calculate a management cost after changing management jobs in accordance with the recommendation information; and
wherein the output device presents the calculated management cost as an effect of the change.

2. A management system according to claim 1, wherein:
the management cost information includes logs of the management system that are collected on a part or all of the plurality of management jobs; and
the processor determines the management cost with reference to the logs.

3. A management system according to claim 2, wherein:
the part or all of the plurality of management jobs include the current management job for each of the plurality of groups; and
the processor determines the management cost of the current management job with reference to the logs.

4. A management system according to claim 3, wherein the processor calculates the management cost of the current management job, based on the operation times of the management job included in the logs.

5. A management system according to claim 1, wherein:
the storage device further includes management item information which associates each of a plurality of management items for identifying kinds of management jobs with a plurality of management jobs included in each of the plurality of management items;
the inter-management-job similarity information includes information on similarity degrees between the plurality of management jobs in each of the plurality of management items;
the management cost information includes information on management costs of the plurality of management jobs in the plurality of management items;
the group management job information includes information for indicating a management job in each of the plurality of management items that is currently set to each of the plurality of groups; and
the processor determines the recommendation degrees on the part or all of the management items.

6. A management system according to claim 5, wherein:
the processor uses at least either one of the management costs and the similarity degrees of the current management jobs set to the plurality of groups in each of the plurality of management items to select a part of the management items from the plurality of management items; and
the processor determines the recommendation degrees on the selected part of the management items.

7. A management system according to claim 1, wherein the processor provides an option of canceling the change in the presenting the effect of the change.

8. A management system according to claim 1, wherein the processor selects all management jobs in the plurality of management jobs one by one to determine the respective recommendation degrees.

9. A management system according to claim 1, wherein the processor uses a product of the determined similarity degree multiplied by the management cost to calculate the recommendation degree.

10. A method of recommending changes of management jobs by a management system that manages management jobs for a plurality of apparatuses included in one or more computer systems and separated into a plurality of groups, the method comprising the steps by the management system of:
providing the one or more computer systems with a processor and a storage device;
selecting groups one by one from the plurality of groups;
identifying, on each of the selected groups, a current management job set to each of the selected groups with reference to group management job information that indicates management jobs currently set to the selected groups;
determining, on each of the selected groups, a similarity degree among management jobs set to the plurality of groups after changing the current management job to a different management job with reference to inter-management-job similarity degree information including information on similarity degrees between a plurality of management jobs;
determining, on each of the selected groups, at least either one of a management cost of the current management job and a management cost of the different management job with reference to management cost information that indicates degrees of load of the plurality of management jobs;
determining, on each of the selected groups, a recommendation degree of the change of the management job using the determined similarity degree and the determined management cost, and
creating, by the management system, information for presenting a pair for a recommended change of management jobs and a recommended priority degree of the change of the management job in accordance with the determined recommendation degrees in the groups selected one by one;

wherein the management cost information includes logs of the management system that are collected on a part or all of the plurality of management jobs; and wherein the management cost is determined with reference to the logs.

11. A method of recommending a change of management jobs according to claim 10, wherein:

each of a plurality of management items for identifying kinds of management jobs is associated with a plurality of management jobs included in each of the plurality of management items;

the inter-management-job similarity information includes information on similarity degrees between the plurality of management jobs in each of the plurality of management items;

the management cost information includes information on management costs of the plurality of management jobs in the plurality of management items;

the group management job information includes information for indicating a management job in each of the plurality of management items that is currently set to each of the plurality of groups; and the recommendation degrees are determined on a part or all of the management items.

12. A method of recommending a change of management jobs according to claim 10, wherein:

the management cost after changing management jobs in accordance with the recommendation information is calculated using logs of the management system collected on the management job; and the calculated management cost is presented as an effect of the change.

13. A computer-readable non-transitory storage medium for storing codes that causes a management system for managing management jobs for a plurality of apparatuses included in one or more computer systems and separated into a plurality of groups to execute a process of recommending a change of management jobs, the process comprising:

selecting groups one by one from the plurality of groups;

identifying, on each of the selected groups, a current management job set to each of the selected groups with reference to group management job information that indicates management jobs currently set to the selected groups;

determining, on each of the selected groups, a similarity degree among management jobs set to the plurality of groups after changing the current management job to a different management job with reference to inter-management-job similarity degree information including information on similarity degrees between a plurality of management jobs;

determining, on each of the selected groups, at least either one of a management cost of the current management job and a management cost of the different management job with reference to management cost information that indicates degrees of load of the plurality of management jobs;

determining, on each of the selected groups, a recommendation degree of the change of the management job using the determined similarity degree and the determined management cost, and creating information for presenting a pair for a recommended change of management jobs and a recommended priority degree of the change of the management job in accordance with the determined recommendation degrees in the groups selected one by one;

wherein the management cost information includes logs of the management system that are collected on a part or all of the plurality of management jobs; and wherein the management cost is determined with reference to the logs.

* * * * *